United States Patent
Muraoka et al.

(10) Patent No.: US 9,049,603 B2
(45) Date of Patent: Jun. 2, 2015

(54) WIRELESS STATION, DETERMINATION APPARATUS, WIRELESS COMMUNICATION SYSTEM, DETERMINATION METHOD, AND STORAGE MEDIUM

(75) Inventors: Kazushi Muraoka, Tokyo (JP); Hiroto Sugahara, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 13/582,280

(22) PCT Filed: Feb. 15, 2011

(86) PCT No.: PCT/JP2011/053606
§ 371 (c)(1),
(2), (4) Date: Aug. 31, 2012

(87) PCT Pub. No.: WO2011/108376
PCT Pub. Date: Sep. 9, 2011

(65) Prior Publication Data
US 2012/0329403 A1 Dec. 27, 2012

(30) Foreign Application Priority Data
Mar. 1, 2010 (JP) ................................. 2010-044350

(51) Int. Cl.
H04W 72/00 (2009.01)
H04W 16/14 (2009.01)
H04B 17/00 (2006.01)
H04W 24/10 (2009.01)

(52) U.S. Cl.
CPC .............. *H04W 16/14* (2013.01); *H04W 24/10* (2013.01)

(58) Field of Classification Search
USPC .................. 455/63.1–63.2, 67.11, 67.13, 454
See application file for complete search history.

(56) References Cited

U.S. PATENT DOCUMENTS

| 2002/0193115 A1 | 12/2002 | Furukawa et al. |
| 2006/0013156 A1 | 1/2006 | Miyoshi et al. |
| 2010/0178924 A1* | 7/2010 | Kashiwase ..................... 455/438 |

(Continued)

FOREIGN PATENT DOCUMENTS

| JP | 10-500266 | 6/1998 |
| JP | 11-234740 A | 8/1999 |
| JP | 2004-80165 A | 3/2004 |

(Continued)

OTHER PUBLICATIONS

International Search Report for PCT/JP2011/053606 dated Apr. 5, 2011.

(Continued)

*Primary Examiner* — Lee Nguyen
(74) *Attorney, Agent, or Firm* — Sughrue Mion, PLLC

(57) ABSTRACT

[Problem] To provide a wireless station, a determination apparatus, a wireless communication system, a determination method, and a storage medium which can carry out appropriate interference causing control in a secondary system adaptively to an actual environment with no change in a configuration of a primary system.
[Means to solve the problem] A wireless station includes a determination means to determine at least one monitoring station measuring a wireless signal, which is transmitted by the wireless station and which causes interference to another system, out of plural wireless stations of a wireless communication system to which the wireless station belongs.

23 Claims, 21 Drawing Sheets

(56) References Cited

U.S. PATENT DOCUMENTS

2012/0322390 A1* 12/2012 Muraoka et al. ........... 455/67.13
2014/0018008 A1* 1/2014 Tang .......................... 455/67.11

FOREIGN PATENT DOCUMENTS

| JP | 2005-33300 | A | 2/2005 |
|---|---|---|---|
| JP | 2007-88941 | | 4/2007 |
| JP | 2007-88941 | A | 4/2007 |
| JP | 2008-306665 | | 12/2008 |
| JP | 2009-21784 | A | 1/2009 |
| JP | 2009-109241 | A | 5/2009 |
| JP | 2009-212920 | A | 9/2009 |
| JP | 2010-11350 | | 1/2010 |
| WO | 2007116794 | A1 | 10/2007 |

OTHER PUBLICATIONS

Gurney, David et al., "Geo-location Database Techniques for Incumbent Protection in the TV White Space," IEEE International Symposium on New Frontiers in Dynamic Spectrum Access Netowrk (DySPAN), Oct. 2008, p. 1-9.

Shiba, Hiroyuki et al., "Cognitive Radio Prototype System with High-accuracy Interference Detection Functions and Interference Avoidance Function," The Institute of Electronics Information and Communication Engineers, IEICE Technical Report SR2008-27, Jul. 2008, pp. 61-66.

Communication issued Apr. 14, 2015 by the Japanese Patent Office in corresponding JP Application No. 2012-503064.

* cited by examiner

FIG. 7

| NUMBER ASSIGNED TO CANDIDATE FOR MONITORING STATION | DESIRED SIGNAL POWER | PERMISSIBLE INTERFERENCE POWER | ESTIMATED VALUE OF PROPAGATION LOSS (FROM INTERFERENCE CAUSING STATION TO EACH CANDIDATE FOR MONITORING STATION) | PERMISSIBLE SENT POWER |
|---|---|---|---|---|
| 1 | $S_1$ | $S_1 - SIR_{th}$ | $L_1$ | $S_1 - SIR_{th} + L_1$ |
| 2 | $S_2$ | $S_2 - SIR_{th}$ | $L_2$ | $S_2 - SIR_{th} + L_2$ |
| 3 | $S_3$ | $S_3 - SIR_{th}$ | $L_3$ | $S_3 - SIR_{th} + L_3$ |
| 4 | $S_4$ | $S_4 - SIR_{th}$ | $L_4$ | $S_4 - SIR_{th} + L_4$ |

FIG. 12

| NUMBER ASSIGNED TO CANDIDATE FOR MONITORING STATION | DESIRED SIGNAL POWER | PERMISSIBLE INTERFERENCE POWER | EXISTING INTERFERENCE POWER | RESIDUAL PERMISSIBLE INTERFERENCE POWER | ESTIMATED VALUE OF PROPAGATION LOSS (FROM INTERFERENCE CAUSING STATION TO EACH CANDIDATE FOR MONITORING STATION) | PERMISSIBLE SENT POWER |
|---|---|---|---|---|---|---|
| 1 | $S_1$ | $S_1 - SIR_{th}$ | $I_{0,1}$ | $I_{r,1}$ | $L_1$ | $I_{r,1} + L_1$ |
| 2 | $S_2$ | $S_2 - SIR_{th}$ | $I_{0,2}$ | $I_{r,2}$ | $L_2$ | $I_{r,2} + L_2$ |
| 3 | $S_3$ | $S_3 - SIR_{th}$ | $I_{0,3}$ | $I_{r,3}$ | $L_3$ | $I_{r,3} + L_3$ |
| 4 | $S_4$ | $S_4 - SIR_{th}$ | $I_{0,4}$ | $I_{r,4}$ | $L_4$ | $I_{r,4} + L_4$ |

WIRELESS STATION, DETERMINATION APPARATUS, WIRELESS COMMUNICATION SYSTEM, DETERMINATION METHOD, AND STORAGE MEDIUM

CROSS REFERENCE TO RELATED APPLICATIONS

This application is a National Stage of International Application No. PCT/JP2011/053606 filed Feb. 15, 2011, claiming priority based on Japanese Patent Application No. 2010-044350 filed Mar. 1, 2010, the contents of all of which are incorporated herein by reference in their entirety.

TECHNICAL FIELD

The present invention relates to a wireless station, a determination apparatus, a wireless communication system, a determination method, and a storage medium.

BACKGROUND ART

The cognitive wireless to recognize a surrounding wireless environment and to optimize a communication parameter on the basis of the wireless environment is well known. As an example of the cognitive wireless, a case that a secondary system (interference causing system) shares a frequency band which is assigned originally to a primary system (interference receiving system) is exemplified.

For example, it is discussed in IEEE 802.22 Draft Ver 2.0 to standardize a WRAN system which is corresponding to the secondary system and which shares a frequency band (TV channel) assigned originally to a TV broadcasting system corresponding to the primary system. Here, IEEE is an abbreviation of Institute of Electrical and Electronic Engineers. Moreover, WRAN is an abbreviation of Wireless Regional Area Network.

When the secondary system shares the frequency band with the primary system, it is necessary that the secondary system does not cause any influence on an existing service which the primary system provides. In order to avoid interference to the primary system, the secondary system must use a frequency band which the primary system does not use temporally and spatially or the secondary system must communicate with making an amount of the interference not larger than an amount of the interference permissible in the primary system.

For example, a service area of the TV broadcasting system, which is corresponding to the primary system, is defined as an area whose receiving radio wave intensity is not smaller than a predetermined level (for example, not smaller than 60 dBµV/m). Then, it is necessary that the secondary system (for example, the above-mentioned WRAN system) suppresses the interference so that a receiver, which exists in the service area, may maintain predetermined SIR (for example, 23 dB). Here, SIR is an abbreviation of Signal to Interference power Ratio.

As an example of an art to suppress the interference which the secondary system causes to the primary system, an art disclosed in a non-patent document 1 is exemplified. The non-patent document 1 describes a method to identify the service area of the TV system by use of a TV database, and to determine transmit power by use of propagation loss, which is estimated on the basis of a propagation model, so that interference power at an edge of the service area may be permissible.

Moreover, a non-patent document 2 describes a wireless communication system shown in the following. According to the wireless communication system, the primary system detects the interference through measuring a decline of throughput, and issues an interference alert to the secondary system in the case of detecting the interference. Then, the secondary system stops using the frequency which the secondary system shares with the primary system.

Moreover, a patent document 1 describes an art shown in the following. According to the art, one wireless apparatus estimates propagation characteristic of a signal (estimate an attenuation coefficient due to a distance), which is transmitted by a transmitter of another system, by use of received interference power (corresponding to received power of the primary signal) from the other system. Then, the wireless apparatus identifies an edge of an area whose received power is not smaller than a desired value, and makes its own transmit power increasing so as to become very close to a permissible value at the edge of the area.

PRECEDING TECHNICAL DOCUMENT

Patent Document

[Patent document 1] Japanese Patent Application Laid-Open No. 2009-212920

Non-Patent Document

[Non-patent document 1] D. Gurney, G. Buchwald, L. Ecklund, S. Kuffner, and J. Grosspietsch, "Geo-location database techniques for incumbent protection in the TV white space," Proc. IEEE International Symposium on New Frontiers in Dynamic Spectrum Access Network (DySPAN), October 2008.

[Non-patent document 2] Hironori Shiba, Munehiro Matsui, Kazunori Akabane, and Kazuhiro Uehara "Cognitive wireless system using technology for detecting interference with high accuracy and for avoiding the interference", Institute of Electronics, Information and Communication Engineers Technological Research Report SR2008-27 pp. 61-66, July 2008.

SUMMARY OF INVENTION

Technical Problem

According to the non-patent document 1, in the case that the propagation model is different from an actual environment, there is a rising probability that an estimation error on the propagation loss increases. Accordingly, when permissible transmit power is determined by use of the estimated value of the propagation loss in the case that the secondary system shares the frequency, reliability on the permissible transmit power is lowered if the estimated value of the propagation loss includes large error. Therefore, it is impossible to carry out appropriate interference causing control to the secondary system.

In contrast, the wireless communication system described in the non-patent document 2 measures the decline of the throughput of the primary system in real time, and issues the interference alert to the secondary system on the basis of the measurement result. Accordingly, it is possible to carry out the appropriate interference causing control adaptively to the actual environment. However, according to the non-patent document 2, it is necessary that a function, which is required for the interference causing control newly, is installed in the primary system in addition to an existing configuration of the primary system. The function required for the interference causing control is, for example, a function to measure the decline of the throughput and a function to inform the secondary system of the alert. Meanwhile, the primary system and the secondary system may not be provided by the same operator. Accordingly, it may not be desirable in some cases to request adding the function, which is used only for using the secondary system, for the primary system.

Moreover, in the case of the patent document 1, under the assumption of the propagation model of the attenuation coefficient due to the distance, the propagation loss to the receiving device of another system is estimated. Since this is the same method as one described in the non-patent document 1, there is a possibility that an error between the propagation model and the actual environment may be large.

The present invention is conceived in order to solve at least one problem mentioned above. An object of the present invention is to provide a wireless station, a determination apparatus, a wireless communication system, a determination method, and a storage medium which can carry out the appropriate interference causing control adaptively to the actual environment in the secondary system with no change in the configuration of the primary system.

Solution to Problem

A wireless station according to the present invention includes a determination means to determine at least one monitoring station measuring a wireless signal, which is transmitted by the wireless station and which causes interference to another system, out of plural wireless stations of a wireless communication system to which the wireless station belongs.

A determination apparatus according to the present invention determines at least one second wireless station measuring a wireless signal, which is transmitted by a first wireless station and which causes interference to another system, out of plural wireless stations of a wireless communication system to which the first wireless station belongs.

A wireless communication system according to the present invention determines at least one second wireless station measuring a wireless signal, which is transmitted by a first wireless station and which causes interference to another system, out of plural wireless stations of a wireless communication system to which the first wireless station belongs.

A determination method according to the present invention determines at least one second wireless station measuring a wireless signal, which is transmitted by a first wireless station and which causes interference to another system, out of plural wireless stations of a wireless communication system to which the first wireless station belongs.

A storage medium according to the present invention stores a computer program to make a computer execute a process of determining at least one second wireless station measuring a wireless signal, which is transmitted by a first wireless station and which causes interference to another system, out of plural wireless stations of a wireless communication system to which the first wireless station belongs.

Advantageous Effects of Invention

According to the present invention, it is possible to carry out the appropriate interference causing control in the secondary system adaptively to the actual environment with no change in the configuration of the primary system.

BRIEF DESCRIPTION OF DRAWINGS

FIG. 7 is a table showing a relation between the permissible transmit power, and a measured value or an estimated value for each candidate for the monitoring station.

FIG. 12 is a table showing a relation between the permissible transmit power and a measured value or an estimated value for each candidate for the monitoring station according to the third exemplary embodiment.

DESCRIPTION OF EMBODIMENTS

First Exemplary Embodiment

Figure 1:
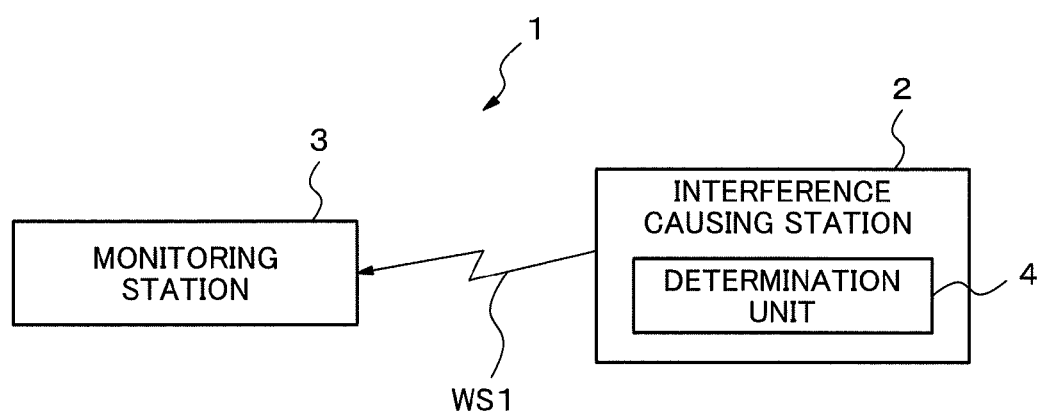
FIG. 1 is a block diagram showing an example of a configuration of a secondary system (wireless communication system) according to a first exemplary embodiment of the present invention.

FIG. 1 is a block diagram showing an example of a configuration of a secondary system 1 (wireless communication system) according to a first exemplary embodiment of the present invention. The secondary system 1 includes an interference causing station 2 (first wireless station) transmitting a wireless signal WS1 which causes interference to a primary system, and at least one monitoring station 3 (second wireless station) which measures the wireless signal. The interference causing station 2 includes a determination unit 4 (determination means/determination apparatus) which determines at least one monitoring station 3 out of plural wireless stations of the secondary system 1 (that is, wireless communication system to which the interference causing station 2 belongs).

Then, the interference causing station 2 can carry out interference causing control, for example, on the basis of a measurement result of the monitoring station 3. Here, the interference causing control means transmit control (for example, transmitting stopping process, transmit power varying control process or the like) for the interference causing station 2.

According to the first exemplary embodiment described above, all processes which are required for the interference causing control can be terminated within the secondary system. Accordingly, it is possible to carry out the interference causing control in the secondary system with no influence on a configuration of the primary system differently from the art described in the non-patent document 2.

Furthermore, according to the first exemplary embodiment described above, for example, the monitoring station 3, which is located around (for example, closely to) a predetermined receiving station (not shown in the figure) existing in a communication area of the primary system, can measure the wireless signal (that is, wireless signal which causes the interference to the primary system), which is transmitted by the interference causing station 2, as a substitution of the receiving station. Accordingly, it is possible to carry out the appropriate interference causing control more adaptively to the actual environment in comparison with the composition that the transmit power is estimated on the basis of the propagation model as described in the non-patent document 1.

In summary, according to the first exemplary embodiment, it is possible to carry out the appropriate interference causing control in the secondary system adaptively to the actual environment with no change in the configuration of the primary system.

Furthermore, the determination unit 4 determines at least one monitoring station 3 out of the plural wireless stations of the secondary system 1. Accordingly, it is possible to determine more appropriate monitoring station 3, specifically for example, to determine the wireless station of the secondary system 1, which exists at a location where influence of the interference is severe especially in an area influenced by the interference, as the monitoring station 3. Therefore, it is possible that the secondary system 1 protects the primary system against the interference more accurately.

Here, it is possible that the interference causing station 2 and the monitoring station 3 are, for example, a base station, a relay station or a terminal station, or it may be preferable that the monitoring station 3 is a station dedicated to the monitoring (monitoring node).

Second Exemplary Embodiment

Figure 2:
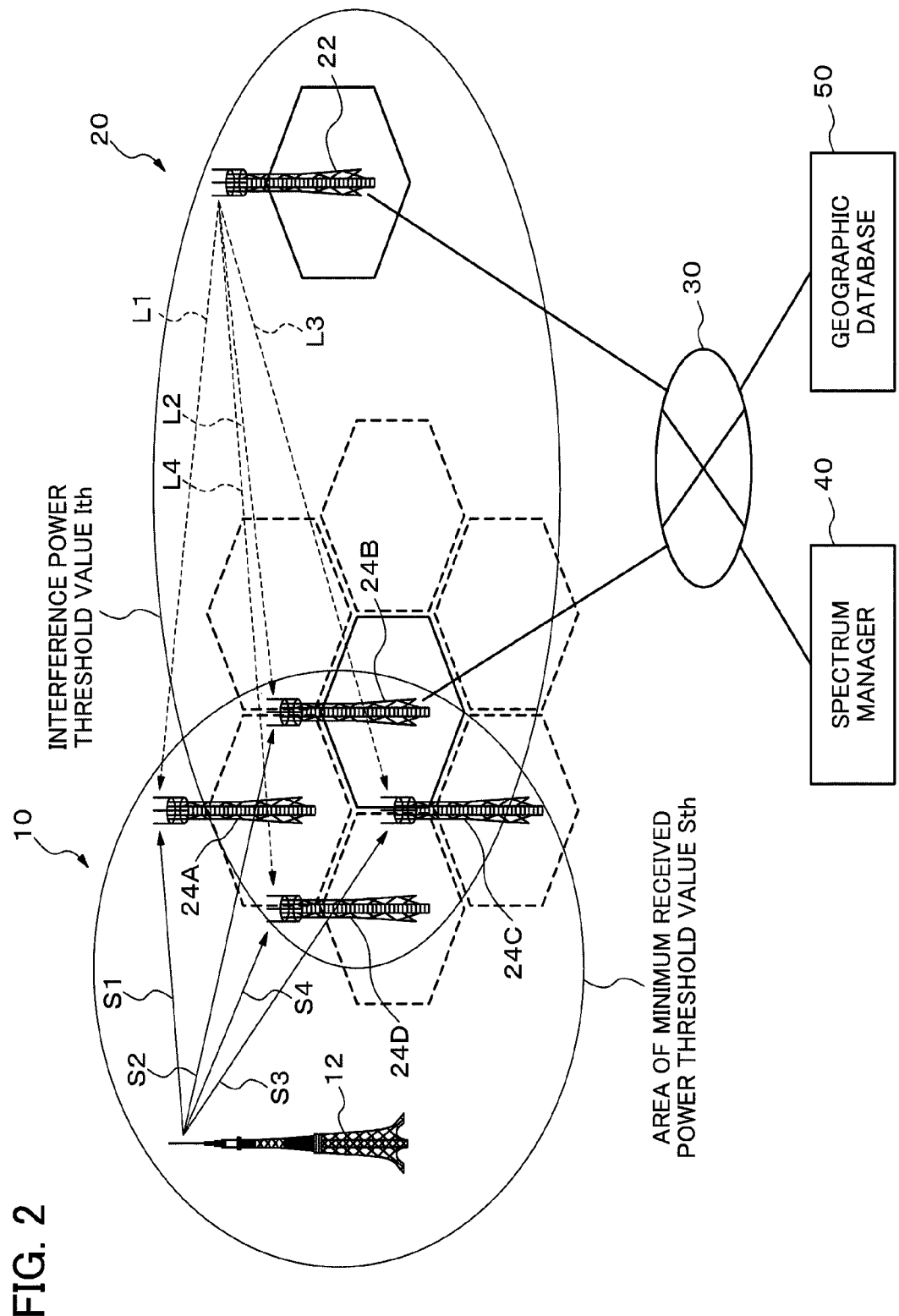
FIG. 2 is a system configuration diagram showing an example of a configuration of a wireless communication system according to a second exemplary embodiment of the present invention.

FIG. 2 is a system configuration diagram showing an example of a configuration of a wireless communication system according to a second exemplary embodiment of the present invention. The wireless communication system includes a primary system 10 and a secondary system 20. Hereinafter, a case that the primary system 10 is a TV broadcasting system and the secondary system is a cellular system is exemplified. It is needless to say that the above case is a mere example. A combination of the primary system 10 and the secondary system 20 is not limited to a combination of the TV broadcasting system and the cellular system. It is also possible that a combination of the TV system and a WRAN system, or a combination of the TV system and a regional wireless system or a disaster prevention wireless system of the local government is applied to a combination of the primary system 10 and the secondary system 20. Furthermore, it may be preferable that a combination of the cellular system and a special purpose wireless system (for example, condominium wireless system, corporate wireless system, farmer's wireless system or the like), a combination of the cellular system and a wireless LAN or a short distance wireless communication, or the like is applied to a combination of the primary system 10 and the secondary system 20. Here, LAN is an abbreviation of Local Area Network.

The primary system 10 includes a TV broadcasting station 12 (primary transmitting station) transmitting a TV broadcasting signal which exists in a predetermined frequency band assigned to the primary system 10, and a receiving station (primary receiving station which is not shown in the figure) which receives the TV broadcasting signal. The broadcasting station 12 and the receiving station exist in an area where it is possible to receive a signal with a minimum received power threshold value Sth. Here, the minimum received power threshold value Sth means the minimum received power of the receiving station out of the received power of the receiving stations, which have necessity to be protected, in the primary system 10. A minimum received power threshold value area, which is specified by the minimum received power threshold value Sth, is arranged basically outside a service area of the primary system 10.

The secondary system 20 includes, at least, an interference causing station (first wireless station) which transmits a wireless signal which causes the interference to the primary system 10 (that is, wireless signal which exists in the same frequency band as the TV broadcasting signal exists), and a monitoring station (second wireless station) which measures the wireless signal. The interference causing station is, for example, a first base station 22, and the monitoring station is, for example, a second base station 24B in FIG. 2.

Here, the monitoring station is not limited to the second base station 24B, as a matter of course. It may be preferable that the monitoring station is another second base station. Moreover, it may be preferable that number of the monitoring stations is plural. Furthermore, it is not always necessary that the monitoring station is the base station. It is possible that the monitoring station is a terminal station, a relay station or a monitoring node dedicated to the monitoring. Moreover, the monitoring station measures not the wireless signal transmitted by the monitoring station (for example, second base station 24) but the wireless signal transmitted by the interference causing station (for example, first base station 22).

The first base station 22 has, at least, a wireless signal transmitting function, a transmit control function and a monitoring station determining function. The wireless signal transmitting function means a function to transmit the wireless signal which exists in the above-mentioned frequency band. The transmit control function means a function to carry out transmit control on the basis of a measurement result (monitoring result) which the second base station 24B outputs. The monitoring station determining function means a function to determine at least one monitoring station (for example, second base station 24B) out of plural wireless stations (for example, base stations) of the secondary system 20.

The second base station 24B (one example of the monitoring station) has, at least, a function to measure the wireless signal ("monitoring function") which is transmitted in the secondary system 20 (that is, wireless signal transmitted by the first base station 22) and which causes interference to the primary system 10. It is also possible that the second base station 24B has furthermore a function to notify ("notification function") measurement-related information (in this case, measurement result, comparison result with a predetermined threshold value, transmit power of the first base station 22 which is calculated on the basis of the measurement result, or the like).

The secondary system 20 is connected with a spectrum manager 40 and a geo-location database 50. Here, the spectrum manager 40, the geo-location database 50, the base stations in the secondary system (in this case, the first base station 22 and the second base station 24B are included) are connected each other via a predetermined network 30 (wired network is exemplified). It is needless to say that the network 30 is not limited to the wired network, and it may be preferable that another network (for example, wireless network) is used as the network 30.

A relation among the spectrum manager 40, the geo-location database 50 and the secondary system 20 is not limited to the above mention. For example, it may be preferable that at least one of the spectrum manager 40 and the geo-location database 50 is installed, for example, in a predetermined base station (for example, base station of the secondary system 20). Moreover, it may be preferable that at least one of the spectrum manager 40 and the geo-location database 50 belongs to a high-level system which integrates the primary system 10 and the secondary system 20.

Basically, the spectrum manager 40 manages a frequency of the secondary system 20. Furthermore, the spectrum manager 40 mediates communication, which is related to interference causing control, between the interference causing station (first base station 22 in FIG. 2) and the monitoring station (second base station 24B in FIG. 2). Specifically, the spectrum manager 40 transmits, for example, "monitoring request", which is received from the first base station 22, to the second base station 24B. Moreover, the spectrum manager 40 transmits "monitoring result, judgment result, transmitting output value (for example, determined transmit power, and transmit power increasing and decreasing information) or the like", which is received from the second base station 24B, to the first base station 22.

The geo-location database 50 stores, at least, predetermined information (for example, information on a location of a wireless communication apparatus, a height of an antenna, directivity of the antenna or the like) on the primary system 10 and the secondary system 20. The geo-location database 50 provides the request source station (for example, first base station 22) with the predetermined information according to necessity.

Figure 3:
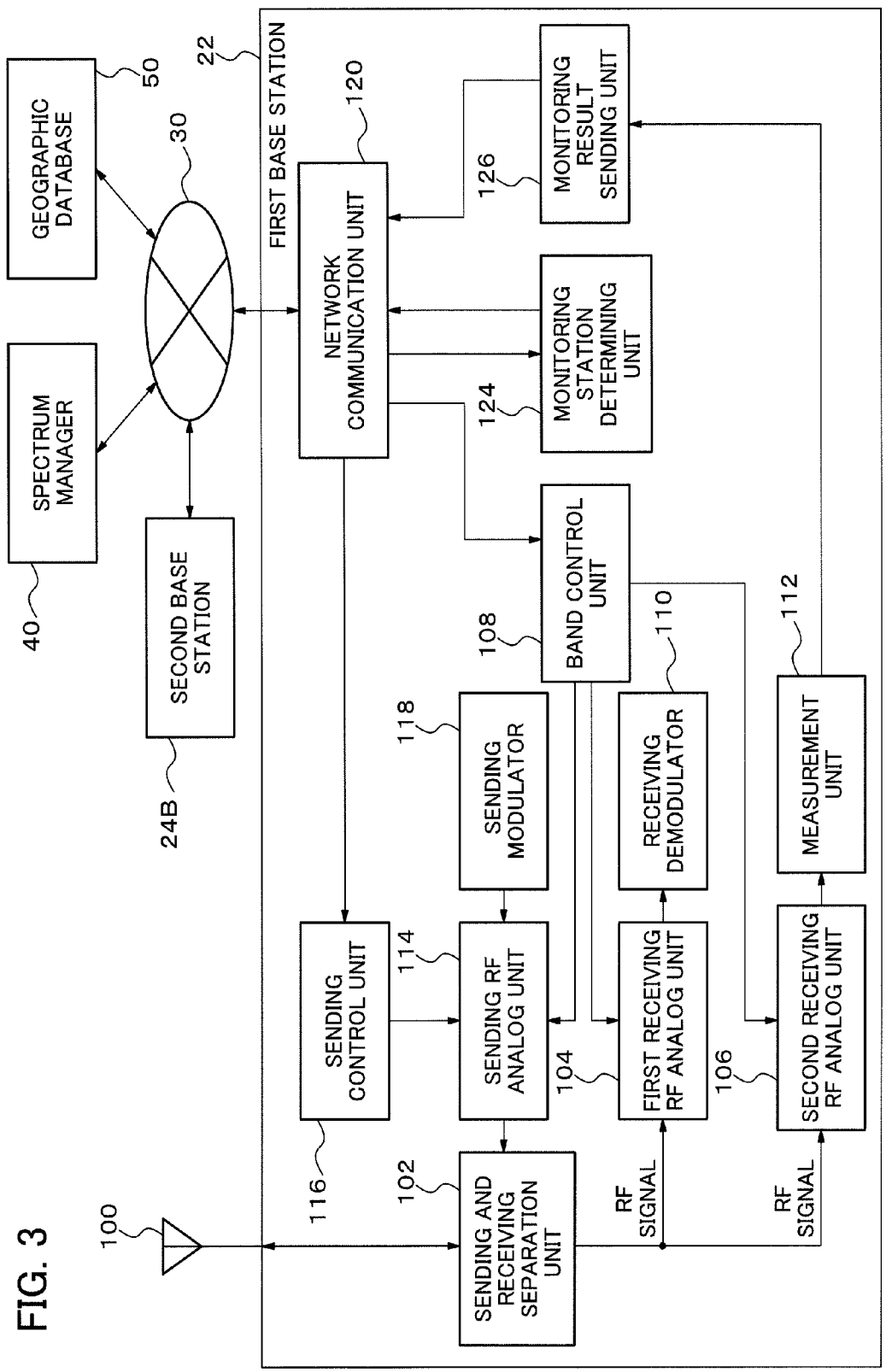
FIG. 3 is a block diagram showing an example of a configuration of an interference causing station (first base station) and a monitoring station (second base station) which are included in a secondary system shown in FIG. 2.

FIG. 3 is a block diagram showing an example of a configuration of the first base station 22 (interference causing station) and the second base station 24B (monitoring station) which are included in the secondary system 20. Here, it is preferable that the first base station 22 originally has, at least, "wireless signal transmitting function", "transmit control function" and "monitoring station determining function" mentioned above. Meanwhile, it is preferable that the second base station 24B has, at least, "monitoring function" mentioned above. That is, it is not always necessary that one base station out of the first base station 22 and the second base station 24B has the function which the other base station has. In order to make description clear, it is assumed hereinafter that the first base station 22 and the second base station 24B has the common configuration each other (that is, it is assumed that each base station has all functions which the first base station 22 and the second base station 24 have), and the description will be provided under the assumption.

The first base station 22 (also, second base station 24) includes an antenna 100, a transmitting and receiving separation unit 102, a first receiving RF (Radio Frequency) analog unit 104, a second receiving RF analog unit 106, and a band control unit 108. Moreover, the first base station 22 (also, second base station 24) includes a receiving demodulator 110, a measurement unit 112 (measurement means), a transmitting RF analog unit 114, a transmit control unit 116 (transmitting control means) and a transmitting modulator 118. Moreover, the first base station 22 (also, second base station 24) includes a network communication unit 120, a monitoring station determining unit 124 (determination means/determination apparatus), and a monitoring result transmitting unit 126.

The antenna 100 transmits and receives a RF signal (some stations carry out only one out of the transmitting and the receiving) to and from another wireless station (another base station, terminal station, relay station, monitoring node or the like). The transmitting and receiving separation unit 102 provides the antenna 100 with a RE signal, which is inputted from the transmitting RF analog unit 114, at a time when transmitting the wireless signal. The transmitting and receiving separation unit 102 provides the first receiving RF analog unit 104 and the second receiving RF analog unit 106 with a RF signal, which the antenna 100 receives, at a time when receiving the wireless signal.

When the transmitting RF analog unit 114 inputs a digital signal to be transmitted, from the transmitting modulator 118, a digital-to-analog conversion part (not shown in the figure) of the transmitting RF analog unit 114 converts the inputted digital signal into an analog signal. A frequency conversion part (not shown in the figure) of the transmitting RF analog unit 114 converts a frequency of the analog signal into a frequency which is determined by the band control unit 108. A band limiting filter (not shown in the figure) of the transmitting RF analog unit 114 removes a signal component which exists outside a desired frequency band. An amplification part (not shown in the figure) of the transmitting RF analog unit 114 amplifies the signal so that transmit power may be in a permissible transmit power range.

The first receiving RF analog unit 104 and the second receiving RF analog unit 106 input the RF analog signal from the transmitting and receiving separation unit 102, and output digital baseband signals to the receiving demodulator 110 and the measurement unit 112 respectively. Here, it is not always necessary that the output of the second receiving RE analog unit 106 is the digital baseband signal. It is also possible to make the measurement unit 112 input the RF analog signal as it is. In order to make the description clear, only a case that the second receiving RF analog unit 106 outputs the digital baseband signal will be described.

Specifically, a low noise amplifier (not shown in the figure) of the first receiving RE analog unit 104 (also, second receiving RF analog unit 106) amplifies the inputted RF signal firstly. Next, a band-pass filter (not shown in the figure) of the first receiving RF analog unit 104 (also, second receiving RF analog unit 106) extracts a RF signal, which exists in the desired frequency band, out of the amplified signal. A frequency conversion part (not shown in the figure) of the first receiving RF analog unit 104 (also, second receiving RF analog unit 106) converts the extracted RF signal, which exists in the desired frequency band, into a baseband signal. The baseband signal is converted from an analog form into a digital form by an analog-to-digital conversion part (not shown in the figure) of the first receiving RF analog unit 104 (also, second receiving RF analog unit 106).

Here, the first receiving RF analog unit 104 and the second receiving RE analog unit 106 are different each other in the frequency band for the extraction. That is, a frequency band of "signal which is usually received" is assigned to the band-pass filter of the first receiving RF analog unit 104. In contrast, a frequency band of "signal of monitoring object" is assigned to the band-pass filter of the second receiving RF analog unit 106. Here, the frequency band of "signal of monitoring object" means, that is, the frequency band which the secondary system shares with the primary system. In other words, the frequency band of "signal of monitoring target" means the frequency band which the interference causing station of the secondary system 20 uses for transmitting the signal.

Here, the assignment of the frequency band to the band-pass filter of the first receiving RF analog unit 104 is carried out, for example, by the band control unit 108. In this case, the band control unit 108 acquires information on the frequency band which is assigned to the band-pass filter, for example, from the spectrum manager 40 via the network communication unit 120.

The assignment of the frequency band to the band-pass filter of the second receiving RF analog unit 106 is carried out by the band control unit 108 similarly to the assignment of the frequency band to the band-pass filer of the first receiving RF analog unit 104. It may be preferable that the frequency band information is notified, for example, at the same time as the interference causing station of the secondary system 20 (first base station 22 in FIG. 2) issues the monitoring request to the monitoring station of the secondary system (second base station 24B in FIG. 2). In this case, the band control unit 108 of the monitoring station extracts the frequency band information out of the received monitoring request information, and assigns the frequency band to the band-pass filter of the second receiving RF analog unit 106.

It is needless to say that a method for the assignment of the frequency band to each band-pass filter is not limited to the above-mentioned method. For example, the following method is applicable. That is, the spectrum manager 40 stores transmit frequency band information of each interference causing station in advance. When the spectrum manager 40 receives the monitoring request from a predetermined interference causing station, the spectrum manager 40 reads the transmit frequency band information on the interference causing station from a memory unit and embeds the transmit frequency bandwidth information in the monitoring request which is transmitted to the monitoring station.

The receiving demodulator 110 regenerates a bit sequence of the signals, which are received usually, through carrying out a demodulation process and a decoding process to the digital baseband signals which are received from the first receiving RF analog unit 104. A receiving processing unit (not shown in the figure) arranged in the following part, carries out a predetermined receiving process to the bit sequence signal.

The measurement unit 112 monitors the monitoring object signal on the basis of the digital baseband signal received from the second receiving RF analog unit 106, and transmits a monitoring result to the monitoring result transmitting unit 126. Here, "monitoring object signal" is, for example, the wireless signal which the first base station 22 corresponding to the interference causing station of the secondary system 20 transmits (interference component denoted as I), and the TV broadcasting signal which is the desired signal transmitted by the broadcasting station 12 of the primary system 10 (signal component denoted as S). Here, in the following description, a case that the measurement unit 112 measures "received power" of the wireless signal transmitted by the interference causing station, and "received power" of the desired signal transmitted by the broadcasting station 12 is exemplified.

The monitoring result transmitting unit 126 transmits the received power information on the monitoring object signal, which is received from the measurement unit 112, to the interference causing station (first base station 22 in FIG. 2) of the secondary system 20 via the network communication unit 120 as the monitoring result.

The band control unit 108 assigns the predetermined frequency bands to the band-pass filters of the transmitting RF analog unit 114, the first receiving RF analog unit 104, and the second receiving RF analog unit 106 respectively.

The monitoring station determining unit 124 determines at least one monitoring station (for example, second base station 24B) out of the plural wireless stations (for example, base stations) of the secondary system 20. Details of a monitoring station determining process will be described in the following (will be described in detail when an operation is explained). Moreover, the monitoring station determining unit 124 issues the monitoring request to the monitoring station in order to request to carry out the monitoring. The monitoring request is transmitted to the monitoring station via the spectrum manager 40. Here, as mentioned above, it is possible that the interference causing station can embed the frequency band information, which is used for assigning the frequency band to the band-pass filter of the second receiving RF analog unit 106 of the monitoring station, in the monitoring request when the interference causing station requests the monitoring.

The transmit control unit 116 and the monitoring station determining unit 124 of the interference causing station receive the monitoring result, which is transmitted by the monitoring station, via the network communication unit 120. Here, the monitoring result means "received power" of the wireless signal transmitted by the interference causing station, and "received power" of the desired signal transmitted by the broadcasting station 12.

The transmit control unit 116 carries out the transmit control for the interference causing station (first base station 22 in FIG. 2) on the basis of the monitoring result. Details of the transmit control will be described later.

The monitoring station determining unit 124 carries out a monitoring station determining process preceding an operation (before carrying out a first monitoring and before the interference causing station transmits the wireless signal). Moreover, the monitoring station determining unit 124 carries out the monitoring station determining process while carrying out the operation (after carrying out the first monitoring and while the interference causing station transmits the wireless signal). Details of each monitoring station determining process will be described later.

Figure 4:
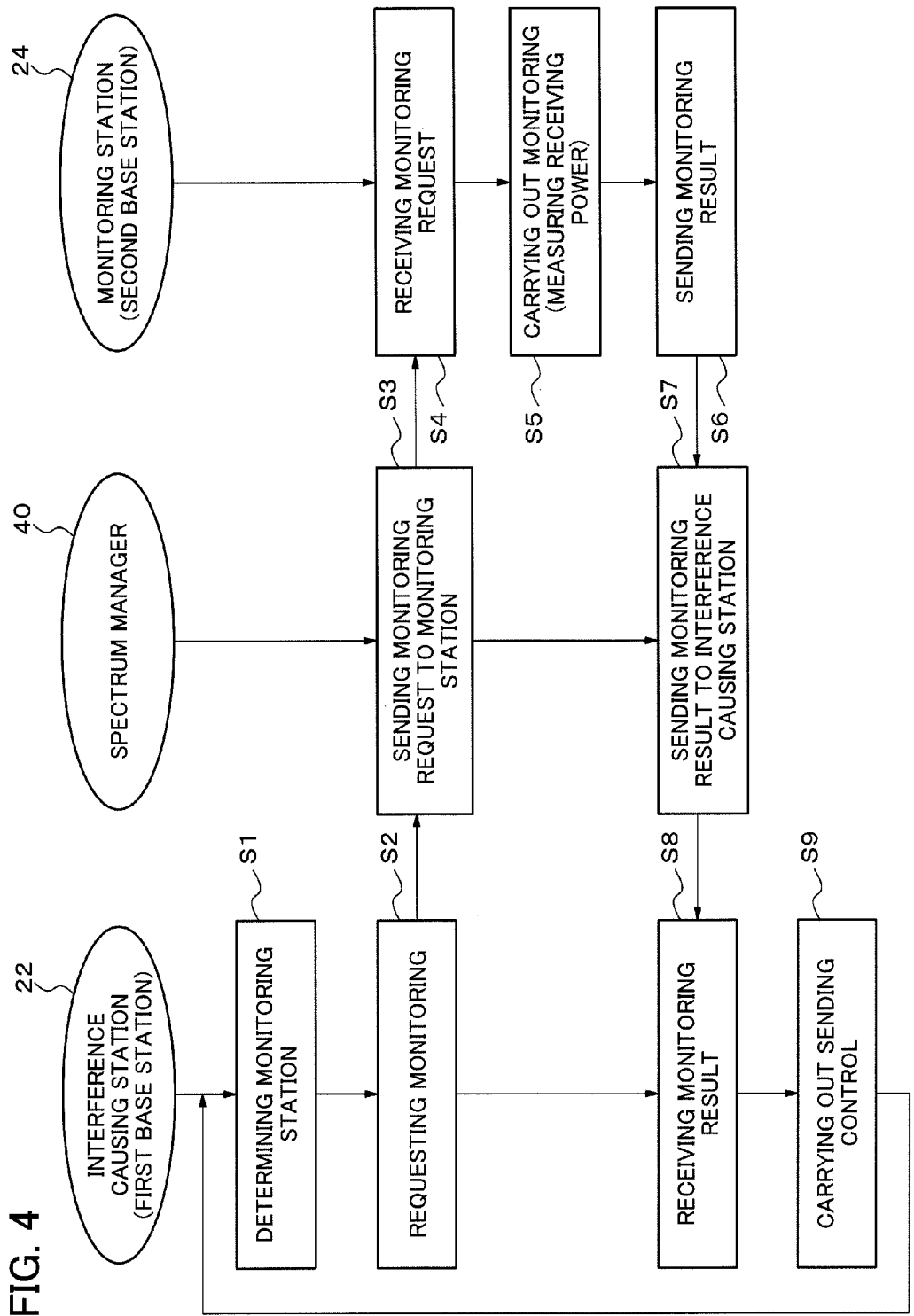
FIG. 4 is a flowchart explaining an example of an operation of the wireless communication system (an example of an operation related to a whole of interference causing control in the secondary system) shown in FIG. 2.

FIG. 4 is a flowchart explaining an example of an operation of the wireless communication system (an example of an operation related to a whole of the interference causing control in the secondary system 20) shown in FIG. 2.

The monitoring station determining unit 124 of the first base station 22 (interference causing station) determines at least one monitoring station out of the plural wireless stations (for example, base stations) of the secondary system 20 (Step S1). Hereinafter, a case that the second base station 24B shown in FIG. 2 is selected as the monitoring station is exemplified. Here, "monitoring station determining process preceding the operation" mentioned above is carried out at a time when processing Step S1 first time (at a time when processing Step S1 not second time on the basis of a loop back in the flowchart, but first time).

The monitoring station determining unit 124 requests the monitoring to the determined monitoring station (Step S2). Here, the monitoring request includes the frequency band information which is used for assigning the frequency band to the band-pass filter of the second receiving RF analog unit 106 of the second base station 24B. Here, the above-mentioned frequency band information is corresponding to information on the frequency band which the secondary system 20 shares with the primary system 10. In other words, the above-mentioned frequency band is corresponding to information on the frequency band of the signal which the first base station 22 transmits.

The spectrum manager 40 transmits the monitoring request, which is received from the first base station 22, to the second base station 24B via the network 30 (Step S3).

The second base station 24B receives the monitoring request via the spectrum manager 40 (Step S4). The second base station 24B assigns the above-mentioned frequency band information, which is embedded in the monitoring request, to the band-pass filter of the second receiving RF analog unit 106. Then, the second base station 24B carries out the monitoring (Step S5). Specifically, the measurement unit 112 of the second base station 24B monitors the object signal on the basis of the digital baseband signal which is received from the second receiving RF analog unit 106, and transmits the monitoring result to the monitoring result transmitting unit 126. Here, the object signal means "received power" of the wireless signal transmitted by the interference causing station, and "received power" of the desired signal transmitted by the broadcasting station 12. Here, the frequency of the wireless signal and the frequency of the desired signal are the same each other. Therefore, the second receiving RF analog unit 106 outputs the digital baseband signal which synthesizes the two signals. Here, the monitoring station (for example, second base station 24B) measures the received power of the primary signal (received power of the desired signal, that is, TV signal) and noise power in advance before the interference causing station transmits the signal. Then, the measurement unit 112 of the monitoring station subtracts the received power of the TV signal and the noise power, which are measured in advance, from power of the synthesized digital baseband signal. Consequently, it is possible that the subtraction result is defined as the measurement result of the received power (received power of the wireless signal transmitted by the interference causing station).

The monitoring result transmitting unit 126 of the second base station 24B transmits information, which is received from the measurement unit 112, on the received power of the monitoring object signal, as the monitoring result (Step S6). The spectrum manager 40 transmits the monitoring result, which is received from the second base station 24B, to the first base station 22 via the network 30 (Step S7).

The first base station 22 receives the monitoring result via the spectrum manager 40 (Step S8). The transmit control unit 116 of the first base station 22 carries out the transmit control on the basis of the monitoring result (Step S9). Meanwhile, it is also possible that the monitoring station determining unit 124 of the first base station 22 carries out "monitoring station determining process while carrying out the operation" mentioned above on the basis of the monitoring result at a time when processing Step S1 second time (that is, at a time when processing Step S1 second time on the basis of the loop back in the flowchart)

Figure 5:
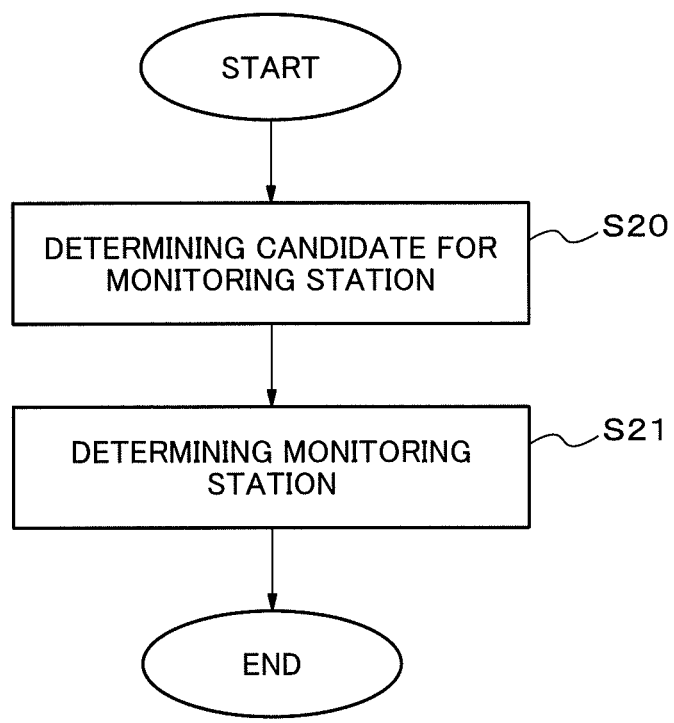
FIG. 5 is a flowchart explaining a first example of an operation which is carried out by a monitoring station determining unit of the first base station (interference causing station).

FIG. 5 is a flowchart showing a first example of an operation of the monitoring station determining unit 124 of the first base station 22 (interference causing station).

Firstly, the monitoring station determining unit 124 determines a plurality of candidates for the monitoring station out of the plural wireless stations of the secondary system 20 on the basis of a predetermined reference before determining the monitoring station (Step S20).

Here, as the predetermined reference for determining the candidate for the monitoring station, for example, a first example and a second example of the reference shown in the following are applicable. It is needless to say that the first example and the second example of the reference are exemplified merely. The predetermined reference for determining the candidate for the monitoring station is not limited to the first example and the second example of the reference.

The first reference is that the measured value (or estimated value) of the received power of the desired signal at each of the plural wireless stations of the secondary system 20 is not smaller than a predetermined first threshold value (minimum received power threshold value Sth). It may be preferable that "each of the plural wireless stations" means all the wireless stations or a part of the wireless stations. Moreover, the desired signal means the TV broadcasting signal which is transmitted by the broadcasting station 12 of the primary system 10.

The second example of the reference is that the measured value (or estimated value) of the received power of the desired signal at each of the plural wireless stations is not smaller than the first threshold value, and the measured value (or estimated value) of the received power of the wireless signal at each of the plural wireless stations is not smaller than a predetermined second threshold value. Here, "wireless signal" means, for example, the wireless signal transmitted by the interference causing station of the secondary system 20.

In the following description, a case that the candidate for the monitoring station is determined on the basis of the second example of the reference. With reference to FIG. 2, the base station of the secondary system 20, which exists in the minimum received power threshold value area and whose received power (measured value or estimated value may be preferable) of the wireless signal in the secondary system is not smaller than the second threshold value, are limited to four base stations, that is, the second base stations 24A to 24D.

Returning to the explanation of FIG. 5, the monitoring station determining unit 124 determines at least one monitoring station out of the plural candidates for the monitoring station (second base stations 24A to 24D) (Step S21). The monitoring station determining unit 124 requests the monitoring to the determined monitoring station.

Hereinafter, a procedure, in which the monitoring station determining unit 124 determines the monitoring station, will be described in detail. The monitoring station determining unit 124 determines at least one candidate for the monitoring station, whose permissible transmit power satisfying a protection condition against the interference is smaller than one of other candidates for the monitoring station or is smaller than a predetermined threshold value, as the monitoring station.

Here, the permissible transmit power is calculated per the candidate for the monitoring station on the basis of desired signal power at each candidate for the monitoring station, and an estimated value of propagation loss between the interference causing station (first base station 22 in FIG. 2) and each candidate for the monitoring station (each of second base stations 24A to 24D in FIG. 2). The desired signal power mentioned above means, for example, the power of the TV broadcasting signal which is transmitted by the broadcasting station 12 of the primary system 10. Moreover, it may be preferable to use a measured value or an estimated value of the desired signal power.

Figure 6:
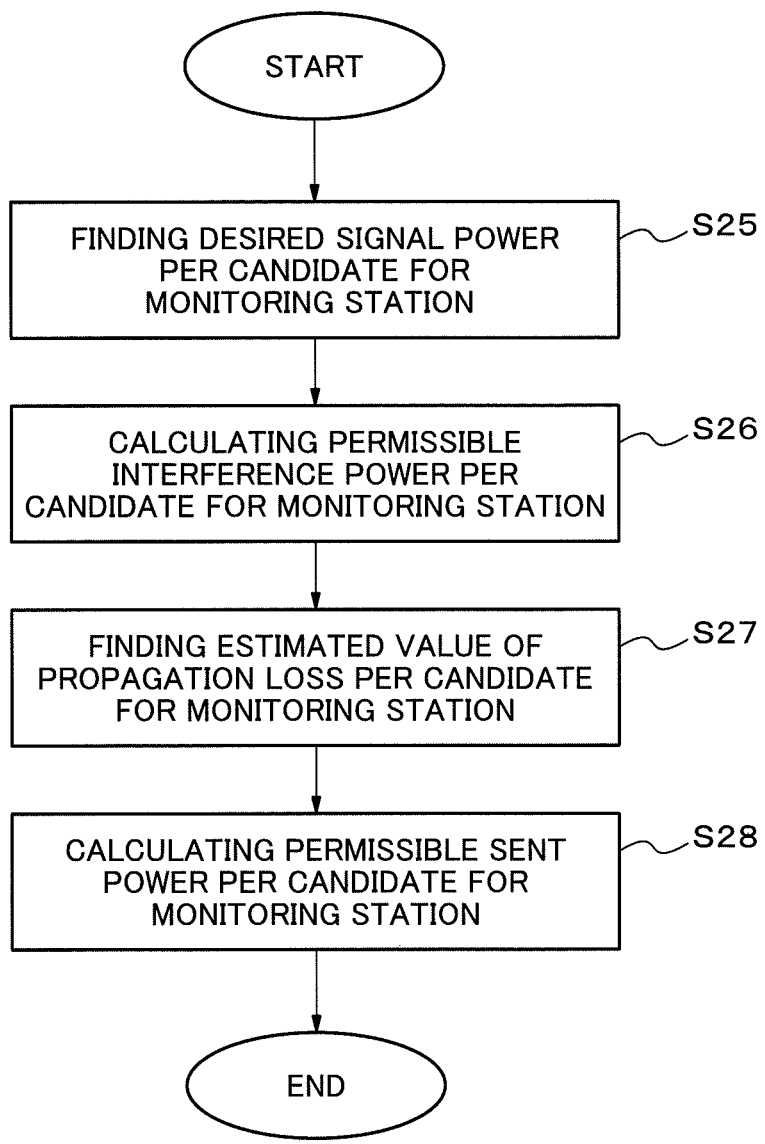
FIG. 6 is a flowchart explaining an example of a calculation procedure in which the monitoring station determining unit of the first base station (interference causing station) calculates permissible transmit power of each candidate for the monitoring station.

Hereinafter, a method to calculate the permissible transmit power will be described with referring to FIG. 6 and FIG. 7 mainly. FIG. 6 is a flowchart explaining an example of a calculation procedure in which the monitoring station determining unit 124 calculates the permissible transmit power of each candidate for the monitoring station (each of the second base stations 24A to 24D in FIG. 2). FIG. 7 is a table showing a relation between the permissible transmit power, and the measured value or the estimated value per the candidate for the monitoring station.

Firstly, the monitoring station determining unit 124 finds the desired signal power Sm (m, which is a number assigned to the candidate for the monitoring station, is 1 to 4 in the present exemplary embodiment.) per the candidate for the monitoring station (Step S25). In this case, it is possible that the monitoring station determining unit 124 collects the measured value of the desired signal power, which is measured in advance, from each candidate for the monitoring station, and defines the measured value as the desired signal power Sm. As a matter of course, a method to find the desired signal power Sm is not limited to the above-mentioned method. It is also possible to estimate the desired signal power Sm, for example, on the basis of the transmit power of the TV broadcasting signal, and the propagation loss which is estimated by use of a predetermined propagation model (propagation estimating formula such as the Okumura-Tai model)

Next, the monitoring station determining unit 124 calculates permissible interference power (Sm−SIRth) per the candidate for the monitoring station (Step S26), where SIRth is a SIR (Signal to Interference Ratio) threshold value which is necessary to protect the TV broadcasting.

Furthermore, the monitoring station determining unit 124 finds an estimated value of the propagation loss Lm (m, which is a number assigned to the candidate for the monitoring station, is 1 to 4 in the present exemplary embodiment.) between the interference causing station (first base station 22) and each candidate for the monitoring station (each of the second base stations 24A to 24D) per the candidate for the monitoring station (Step S27). In this case, if the monitoring station determining unit 124 has estimated the propagation loss between the interference causing station and the monitoring station, the monitoring station determining unit 124 can use the propagation loss as the estimated value of the propagation loss Lm. It may be preferable that the interference causing station stores the estimated value of the propagation loss which has been measured, and it is also possible to acquire the estimated value of the propagation loss from another apparatus (for example, each candidate for the monitoring station, spectrum manager 40, or the like). It is needless to say that a method for finding the estimated value of the propagation loss Lm is not limited to the above mentioned method (method using the past data)

The monitoring station determining unit 124 calculates the permissible transmit power (Sm−SIRth+Lm) per the candidate for the monitoring station (each of the second base stations 24A to 24D) (Step S28).

Then, the monitoring station determining unit 124 determines at least one candidate for the monitoring station, whose permissible transmit power satisfying the protection condition against the interference is smaller than one of other candidates for the monitoring station or is smaller than a predetermined threshold value, as the monitoring station out of the candidates for the monitoring station. For example, it is possible that the monitoring station determining unit 124 determines one candidate, whose permissible transmit power is the smallest among ones of the candidates for the monitoring station (second base stations 24A to 24D), as the monitoring station, or it is possible to determine at least one candidate, whose permissible transmit power is not larger than a predetermined threshold value, as the monitoring station.

Figure 8:
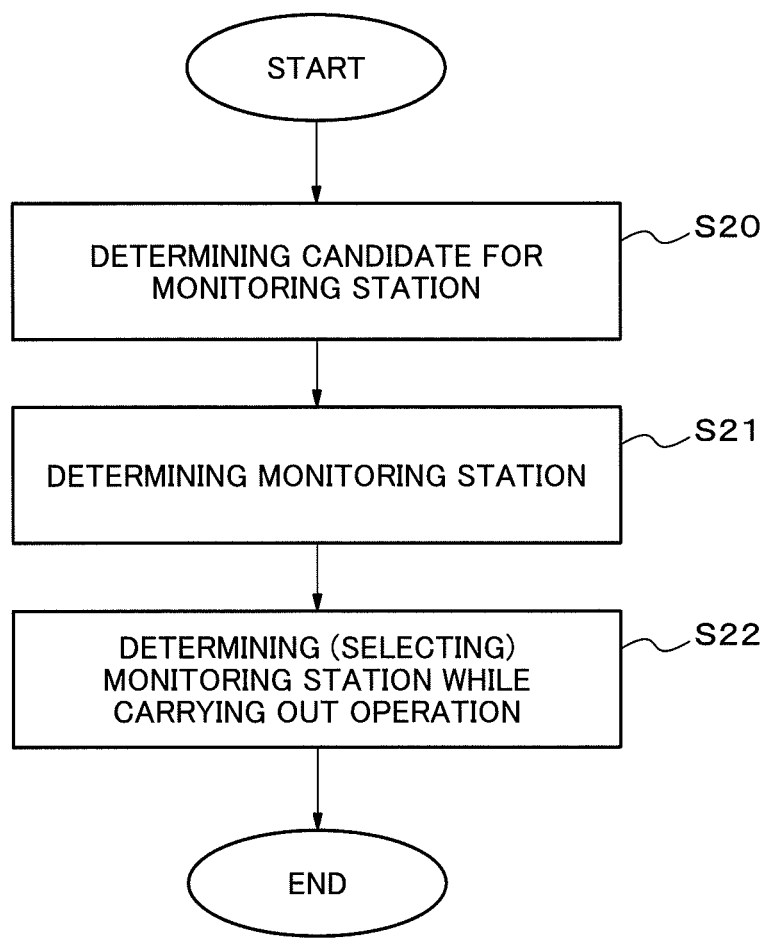
FIG. 8 is a flowchart explaining a second example of the operation which is carried out by the monitoring station determining unit of the first base station (interference causing station).

FIG. 8 is a flowchart explaining a second example of the operation which is carried out by the monitoring station determining unit 124 of the first base station (interference causing station).

Since Step S20 and Step S21 have been explained by use of FIG. 5, description on the steps is omitted, and only Step 22 will be explained in the following. Here, Step S22 is carried out only while the operation is carried out (after the first monitoring is carried out and while the interference causing station transmits the wireless signal). Accordingly, Step S20 and Step S21 are carried out when processing Step S1 first time, and Step S22 is carried out when processing Step S1 second time or after the second time process (that is, Step S1 which is carried out after Step 9 is carried out) in FIG. 4. While FIG. 8 shows that Step S20 to Step S22 are carried out in series, it is preferable to branch off Step S22 from Step S20 and Step S21 actually through using, for example, a process completion flag or the like.

As an assumption for carrying out Step S22, it is assumed that a plurality of the wireless stations corresponding to the monitoring station (for example, second base station 24B and second base station 24C) are determined. The monitoring station determining unit 124 receives the monitoring result from each of the second base station 24B and the second base station 24C after the interference causing station starts transmitting the wireless signal. Here, specifically, the monitoring result means "received power" of the wireless signal which is transmitted by the interference causing station, and "received power" of the desired signal which is transmitted by the broadcasting station 12. Furthermore, the monitoring result means "received power" which is measured by each monitoring station (each of the second base station 24B and the base station 24C) at each monitoring station.

The monitoring station determining unit 124 calculates SIR, which indicates ratio between both received powers, per the monitoring station, and determines at least one monitoring station, whose SIR is smaller than one of another monitoring station or is smaller than a predetermined threshold, as the monitoring station which should carry out the monitoring next time. For example, in the case that SIR of the base station 24B is the smallest, the monitoring station determining unit 124 determines the base station 24B as the monitoring station which should carry out the monitoring next time (in other words, the base station 24D, whose SIR is larger than one of the base station 24B, is removed from the monitoring stations which should carry out the monitoring next time)

Figure 9:
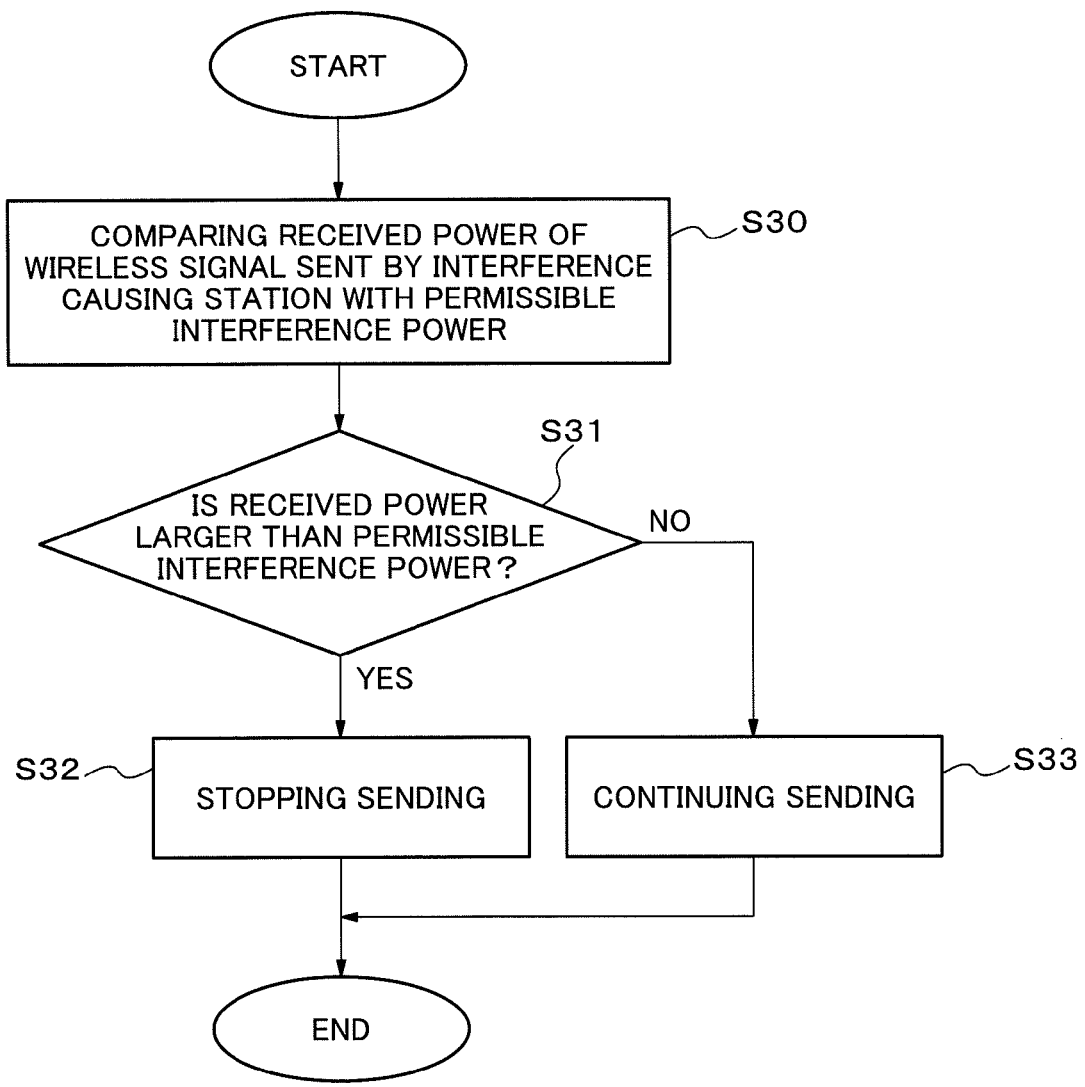
FIG. 9 is a flowchart explaining an example of transmit control which is carried out by a transmit control unit of the first base station (interference causing station).

FIG. 9 is a flowchart explaining an example of the transmit control which is carried out by the transmit control unit 116 of the first base station 22 (interference causing station). The transmit control unit 116 compares the received power, which is the monitoring result, of the wireless signal transmitted by the interference causing station (abbreviated simply as received power in the flowchart) with the permissible interference power (threshold value) (Step S30). Here, it is assumed that the permissible interference power, which is the threshold value, is stored by a predetermined storage means of the first base station 22 in advance before the comparison with the monitoring result. In the case that the transmit control unit 116 judges that the received power is larger than the permissible interference power (Yes in Step S31), the transmit control unit 116 makes the first base station 22 stop the transmitting (transmitting of the signal which shares the frequency band with the signal of the primary system 10) (Step S32). On the other hand, in the case that the transmit control unit 116 judges that the received power is not larger than the permissible interference power (No in Step S31), the transmit control unit 116 makes the first base station 22 continue the transmitting (Step S33).

According to the second exemplary embodiment described above, the interference causing control in the secondary system 20 is carried out on the basis of not information which the primary system 10 provides (for example, interference alert), but the information which the secondary system 20 itself measures. Here, as a specific example of "information which the secondary system 20 itself measures", information on the wireless signal, which is transmitted by the interference causing station of the secondary system 20 and which is measured by the monitoring station of the secondary system 20, can be exemplified. That is, differently from the art described in the non-patent document 2, it is possible to carry out the interference causing control in the secondary system with no influence on the configuration of the primary system 10.

Furthermore, according to the second exemplary embodiment described above, the monitoring station of the secondary system 20 (at least one out of the second base stations 24A to 24D in FIG. 2), which is located around the primary receiving station (for example, closely to the primary receiving station) existing in the service area (or, minimum received power threshold value area) of the primary system 10, measures the received power of the wireless signal, which is transmitted by the interference causing station (for example, first base station 22 in FIG. 2) of the secondary system 20, as a substitution of the primary receiving station. Accordingly, it is possible to carry out the appropriate interference causing control more adaptively to the actual environment in comparison with the composition that the transmit power is estimated on the basis of the propagation model as described in the non-patent document 1.

In summary, according to the second exemplary embodiment, it is possible to carry out the appropriate interference causing control in the secondary system 20 adaptively to the actual environment with no change in the configuration of the primary system.

Furthermore, according to the second exemplary embodiment described above, the monitoring station determining unit 124 determines at least one wireless station (for example, second base station 24B in FIG. 2), whose permissible transmit power satisfying the protection condition against the interference is smaller than one of another wireless station or is smaller than a predetermined threshold value, as the monitoring station out of the plural wireless stations (for example, second base stations 24A to 24D in FIG. 2) of the secondary system 20. Here, it is appropriate to consider that a cell including the monitoring station, whose permissible transmit power is smaller than one of other wireless stations or is smaller than a predetermined threshold value, causes severe influence of the interference on the primary system 10. Accordingly, it is possible to protect the primary system against the interference more accurately in the secondary system 20 since it is possible to carry out the monitoring in the cell.

Furthermore, according to the second exemplary embodiment described above, the first base station 22 stops transmitting the wireless signal in the case that the received power (corresponding to the monitoring result) of the wireless signal, which is transmitted by the interference causing station and which causes the interference to the primary system 10, is larger than the permissible interference power. Accordingly, it is possible to avoid the interference to the primary system 10.

While the case that the interference causing station compares the received power with the threshold value is exemplified according to the above description, the present invention is not limited to the case. For example, it is also possible that the monitoring station carries out the comparison process. In this case, it is preferable that the monitoring station carries out the comparison process and transmits the comparison result (judgment whether larger or not larger than the threshold value, in other words, information on judgment whether stopping the transmitting or not) to the interference causing station. Moreover, in this case, it is also possible that the monitoring station makes its own storage means store the threshold value (permissible interference power) before carrying out the comparison process, or it is also possible that the monitoring station acquires the threshold value, for example, from the spectrum manager 40 when carrying out the comparison process.

Moreover, it is not always necessary that number of the threshold values (that is, permissible interference power) is one. It is also possible to use a plurality of the threshold values. For example, in the case of using three threshold values, it is possible to define four states (for example, increasing transmit power, maintaining current state, decreasing transmit power and stopping transmitting).

Moreover, it is not always necessary that the threshold value is fixed. It is also possible that the threshold value changes dynamically on the basis of a predetermined condition (for example, surrounding traffic or the like).

Moreover, according to the second exemplary embodiment described above, it is not mandatory to carry out "candidate for the monitoring station determining process". That is, it is also possible that the monitoring station determining unit 124 determines the monitoring station directly among all of or a part of the wireless stations of the secondary system 20 without determining the candidate for the monitoring station.

Moreover, according to the second exemplary embodiment described above, it is not mandatory to carry out "monitoring station determining process while carrying out the operation".

Moreover, it is not mandatory that the monitoring station measures the desired signal (signal transmitted by the broadcasting station of the primary system). The reason is that it is not always necessary that "desired signal power", which is used when the permissible transmit power is calculated in "monitoring station determining process before carrying out the operation", should be "measured value", and it may be preferable that "desired signal power" is "estimated value".

Third Exemplary Embodiment

Figure 10:
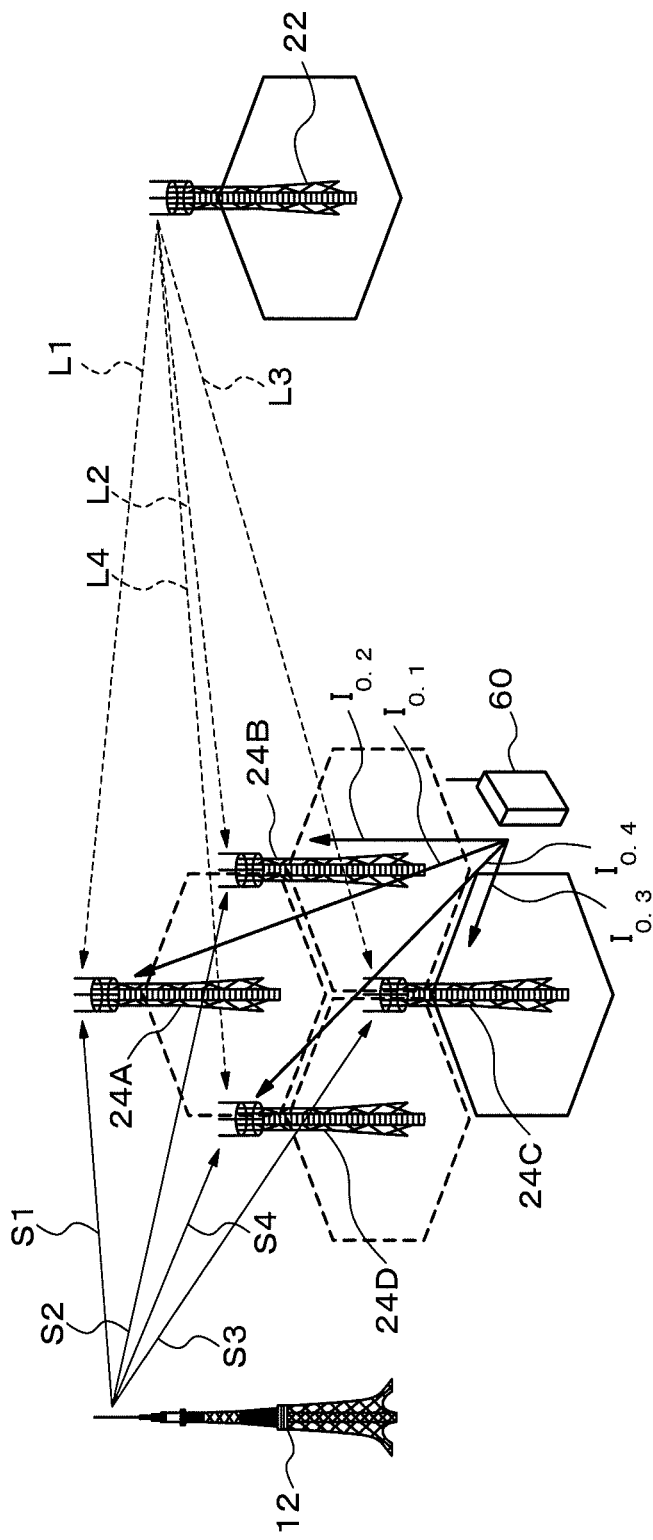
FIG. 10 is a system configuration diagram showing an example of a configuration of a wireless communication system according to a third exemplary embodiment in order to explain existing interference power which another interference causing station causes.
Figure 11:
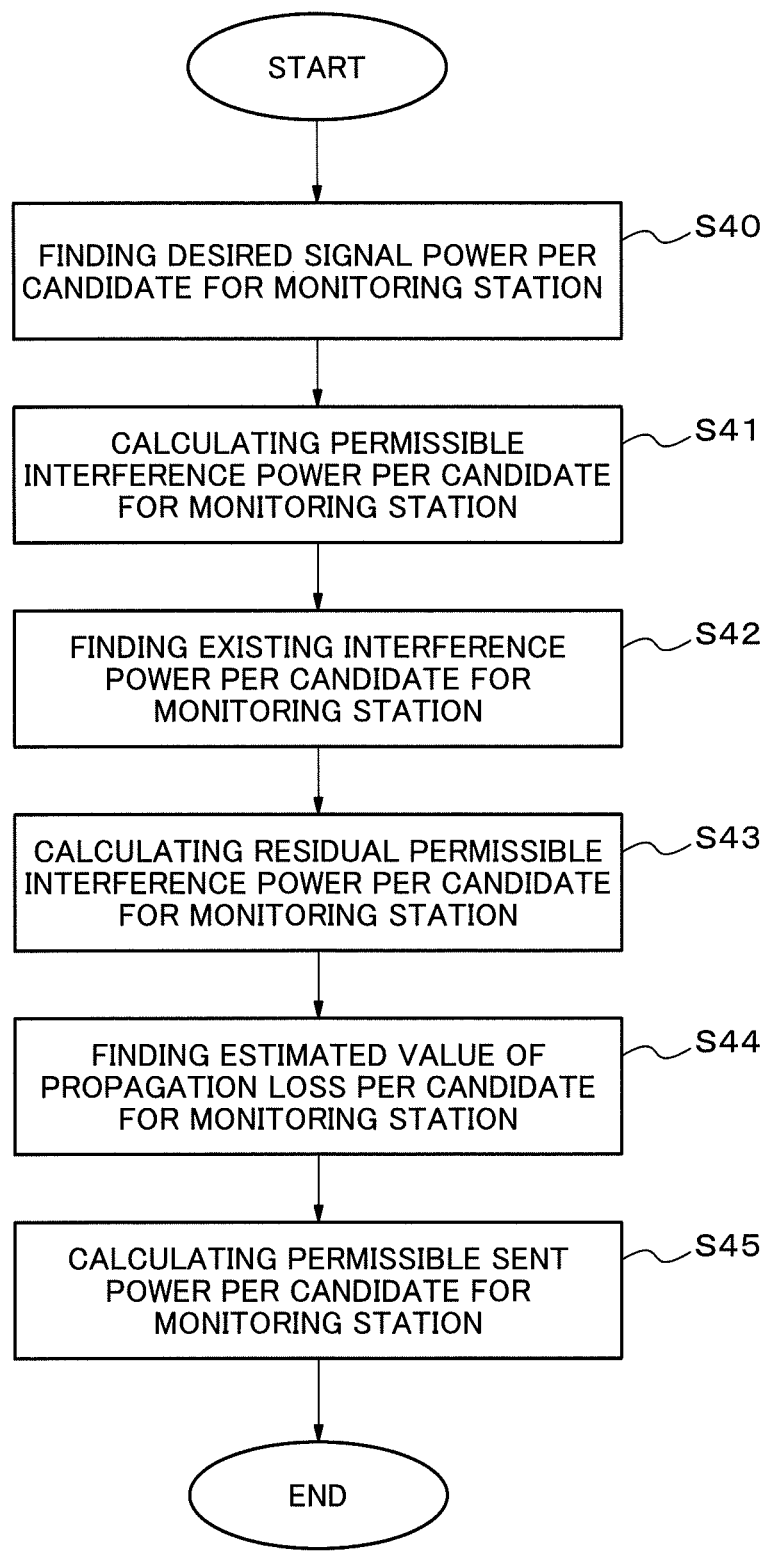
FIG. 11 is a flowchart explaining an example of a calculation procedure in which a monitoring station determining unit of a first base station (interference causing station) calculates permissible transmit power of each candidate for a monitoring station according to the third exemplary embodiment.

A wireless communication system according to a third exemplary embodiment of the present invention will be described in the following with referring mainly to FIG. 10, FIG. 11 and FIG. 12. FIG. 10 is a system configuration diagram showing an example of a configuration of the wireless communication system according to the third exemplary embodiment in order to explain existing interference power which another interference causing station causes. FIG. 11 is a flowchart explaining an example of a calculation procedure, in which the monitoring station determining unit 124 of a first base station (interference causing station) calculates permissible transmit power of each candidate for a monitoring station, according to the third exemplary embodiment. FIG. 12 is a table showing a relation between the permissible transmit power and a measured value or an estimated value per the candidate for the monitoring station according to the third exemplary embodiment.

Here, FIG. 10 is firstly referred to, and a case that it is assumed that the candidate for the monitoring station (second base station 24A to 24D) is determined in advance is exemplified.

Each wireless station of the secondary system 20 (for example, each candidate for the monitoring station) often receives the existing interference power which another interference causing station 60 causes. The exemplary embodiment has a feature that the above-mentioned existing interference power, which is one metric for determining the monitoring station, is taken into consideration when calculating the permissible transmit power of each wireless station.

Here, "another interference causing station" means, for example, at least one interference causing station (that is, interference causing station which shares frequency band which is assigned to the primary system originally) which is different from the interference causing station such as the first base station 22. In this case, "at least one different interference causing station" is corresponding to another interference causing station (for example, base station, terminal station or relay station) of the secondary system 20 to which the first base station 22 belongs, or a predetermined interference causing station (for example, base station, terminal station or relay station) of another secondary system which is different from the secondary system 20.

Next, a method for calculating the permissible transmit power according to the exemplary embodiment will be described with referring mainly to FIG. 11 and FIG. 12. Here, a process described in FIG. 11 is the same basically as one described in FIG. 6. Accordingly, the process in FIG. 11, which is the same as one in FIG. 6, may be omitted in the following description in some cases.

Firstly, the monitoring station determining unit 124 finds the desired signal power Sm (m, which is number assigned to the candidate for the monitoring station, is 1 to 4 according to the present exemplary embodiment.) per the candidate for the monitoring station (Step S40 corresponding to Step S25 in FIG. 6). The monitoring station determining unit 124 calculates permissible interference power (Sm−SIRth) per the candidate for the monitoring station (Step S41 corresponding to Step S26 in FIG. 6).

Furthermore, the monitoring station determining unit 124 finds the existing interference power Io,m (m, which is number assigned to the candidate for the monitoring station, is 1 to 4 according to the present exemplary embodiment.) per the candidate for the monitoring station (Step S42). Here, it is possible to use, for example, the existing interference power Io,m which each candidate for the monitoring station measures before the interference causing station starts transmitting the wireless signal, or it is also possible that, in the case that it is possible to acquire transmitting information (information on a location, transmit power, a height of an antenna, or the like) of "another interference causing station", the existing interference power Io,m is calculated on the basis of a predetermined propagation formula by use of the transmitting information.

The monitoring station determining unit 124 calculates residual permissible interference power Ir,m (m, which is number assigned to the candidate for the monitoring station, is 1 to 4 according to the exemplary embodiment.) per the candidate for the monitoring station (Step S43). It is possible to calculate the residual permissible interference power Ir,m through subtracting the existing interference power Io,m from the permissible interference power (Sm−SIRth). Specifically, the residual permissible interference power Ir,m is calculated, for example, by "formula 1" shown in the following.

$$I_{r,m} = 10 \log\left(10^{\frac{S_m - SIR_{th}}{10}} - 10^{\frac{I_{o,m}}{10}}\right) \quad \text{(formula 1)}$$

The monitoring station determining unit 124 finds an estimated value of propagation loss Lm (m, which is number assigned to the candidate for the monitoring station, is 1 to 4 according to the exemplary embodiment.) between the interference causing station (first base station 22) and each candidate for the monitoring station per the candidate for the monitoring station (Step S44 corresponding to Step S27 in FIG. 6).

The monitoring station determining unit 124 calculates the permissible transmit power (Ir,m+Lm) per the candidate for the monitoring station (each of second base stations 24A to 24D) (Step S45)

According to the third exemplary embodiment mentioned above, it is possible to calculate the permissible transmit power in consideration of the existing interference in the case that there is the interference caused by "another interference causing station" (existing interference). Accordingly, it is possible to determine the wireless station, which exists at a location receiving quite severe influence of the interference in an area receiving the influence of the interference, as the monitoring station. Therefore, it is possible to protect the primary system 10 against the interference more accurately.

Fourth Exemplary Embodiment

It may be difficult in some cases to measure interference causing signal power (that is, received power of the signal transmitted by the interference causing station), which is smaller than interference receiving signal power (received power of the desired signal transmitted by the broadcasting station 12 of the primary system), in a cell in which the interference receiving signal power is large (in other words, in the monitoring station whose received power of the desired signal transmitted by the broadcasting station 12 of the primary system is large).

Figure 13:
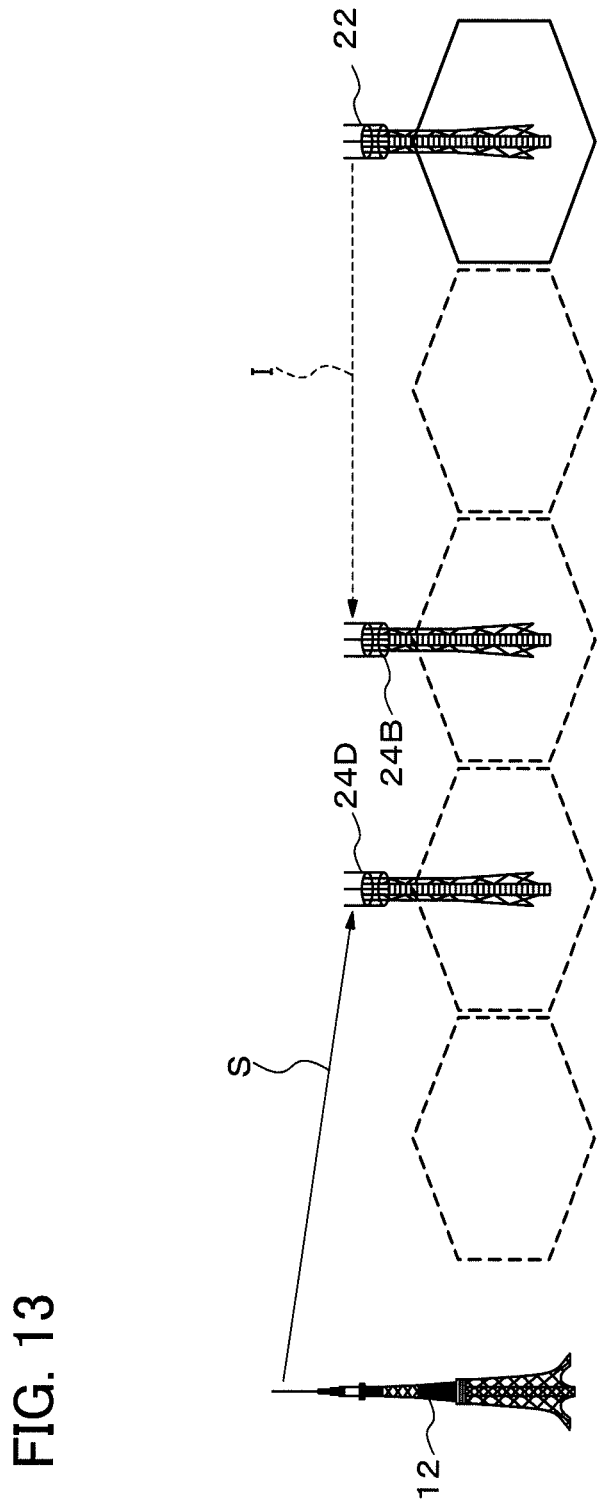
FIG. 13 is a conceptual diagram (system configuration diagram) explaining a feature according to a fourth exemplary embodiment.

Then, the present exemplary embodiment has a feature that the interference receiving signal power S and the interference causing signal power I are measured in the different cells (different monitoring stations) each other as shown in FIG. 13 (conceptual diagram (system configuration diagram) for explaining the feature according to the fourth exemplary embodiment).

Here, a station which monitors the interference receiving signal power S is called "interference receiving signal monitoring station" (first monitoring station), and a station which monitors the interference causing signal power I is called "interference causing signal monitoring station (second monitoring station) in FIG. 13 and in the following description. It is assumed that the interference receiving signal monitoring station 24D and the interference causing signal monitoring station 24B are base stations each of which has, at least, the function of the second base station.

Hereinafter, a method for determining each monitoring station will be described in the following. Here, the monitoring station determining unit 124 included in the first base station carries out determining each monitoring station. Moreover, a case that a predetermined number of the candidates for the monitoring station are determined in advance before determining the monitoring station is exemplified.

Firstly, the method for determining the interference receiving signal monitoring station will be described. The monitoring station determining unit 124 determines the candidate for the monitoring station, whose permissible transmit power is the smallest among a plurality of the candidates for the monitoring station, as the interference receiving signal monitoring station 24D. In this case, permissible interference power at the interference receiving signal monitoring station 24D is calculated. Then, the permissible interference power, which is calculated, is used in the interference causing signal monitoring station as a threshold value.

Figure 14:
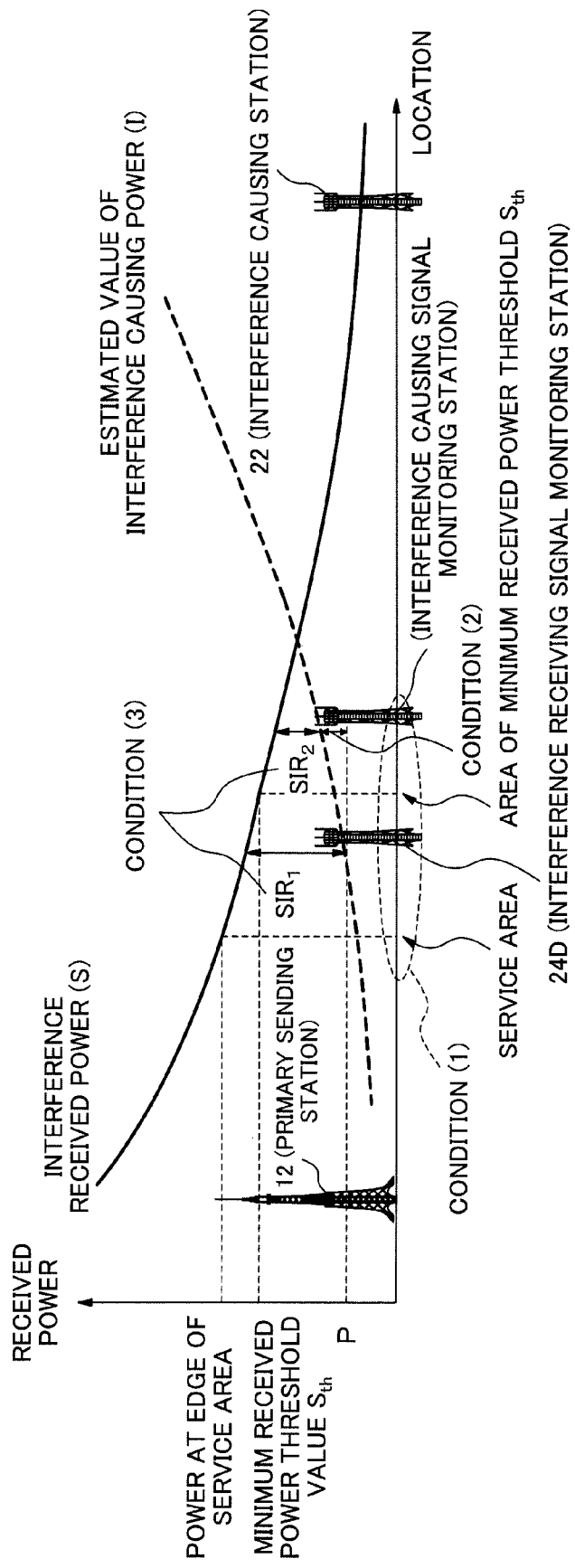
FIG. 14 shows a relation between a location of an interference receiving signal monitoring station and received power, and a relation between a location of an interference causing signal monitoring station and the received power, and shows an example of a condition for determining the interference causing signal monitoring station.

Next, the method for determining interference causing signal monitoring station will be described. The monitoring station determining unit 124 determines, for example, a base station, which satisfies all of the following conditions (1) to (3) (refer to FIG. 14), as the interference causing signal monitoring station.

That is, it is possible, for example, to select the interference receiving signal monitoring station out of the candidates for the monitoring station, and to select the interference causing signal monitoring station out of the surrounding base stations which satisfy the condition (1).

The condition (1) is that the interference causing signal monitoring station exists around the interference receiving signal monitoring station. For example, a base station which is located within a predetermined distance from the interference receiving signal monitoring station, and a base station which is registered as an adjacent cell of the interference receiving signal monitoring station satisfy the condition (1).

The condition (2) is that it is judged that the interference causing power at the base station is larger than the interference causing power at the interference receiving signal monitoring station. For example, a base station whose distance from the interference causing station is shorter than one from the interference receiving signal monitoring station (since propagation loss is small equivalently, severe interference is received) satisfies the condition (2).

The condition (3) is that interference causing measurement accuracy of the base station is larger than an interference causing measurement accuracy metric of the interference receiving signal monitoring station. Here, the interference causing measurement accuracy metric can be expressed, for example, by $\gamma=1/(L*(S+I'+N))$, where L is the propagation loss from the interference causing cell, and I' is the interference caused by another interference causing station (definition is referred to the third exemplary embodiment), and N is the noise power. The interference causing measurement accuracy metric is calculated on the basis of signal power (S+I'+N) which excludes the interference causing signal power and which makes accuracy of estimating the interference causing signal degraded, and the propagation loss L from the interference causing cell. In the case that the signal power excluding the interference causing signal power is small and the propagation loss is small, the metric indicates that the measurement accuracy become improved. Here, it is also possible that the interference causing measurement accuracy metric is defined as $1/(L*(S+N))$ through neglecting the existing interference power I'. Furthermore, it may be preferable that the interference causing measurement accuracy metric is defined as $1/(L*S)$ through neglecting the noise power N. Here, the interference causing measurement accuracy metric $1/(L*S)$ is inversely proportional to the reciprocal of SIR. Then, that the interference causing measurement accuracy metric is large (small) means that SIR is small (large).

With the condition (1) being satisfied, a propagation environment at the interference causing signal monitoring station is similar to the propagation environment around the interference receiving signal monitoring station. Then, it is possible that the interference causing signal monitoring station measures the interference causing signal as a substitution of the interference receiving signal monitoring station.

With the condition (2) being satisfied, when the interference causing power measured by the interference causing signal monitoring station is not larger than the permissible interference power (indicated by P in FIG. 14) which is calculated by the interference receiving signal monitoring station, it is possible that the interference power at the interference receiving signal monitoring station is not larger than the permissible interference power in the interference receiving signal monitoring station where it is estimated that the interference causing power is smaller than one at the interference causing signal monitoring station.

With the condition (3) being satisfied, it is possible to improve the accuracy of measuring the interference causing power since the interference causing signal monitoring station has the larger interference causing measurement accuracy metric than the interference receiving signal monitoring station has.

That is, it is possible to carry out the monitoring so that the interference causing signal power, which is measured at the interference causing signal monitoring station, may not exceed the permissible interference power at the interference receiving signal monitoring station. That is, since it is possible to protect the primary system, and it is possible that the interference causing signal monitoring station, which can measure the interference causing power with ease in comparison with the interference receiving signal monitoring station, measures the interference causing power, it is possible to improve the accuracy of measuring the interference causing power.

Fifth Exemplary Embodiment

Figure 15:
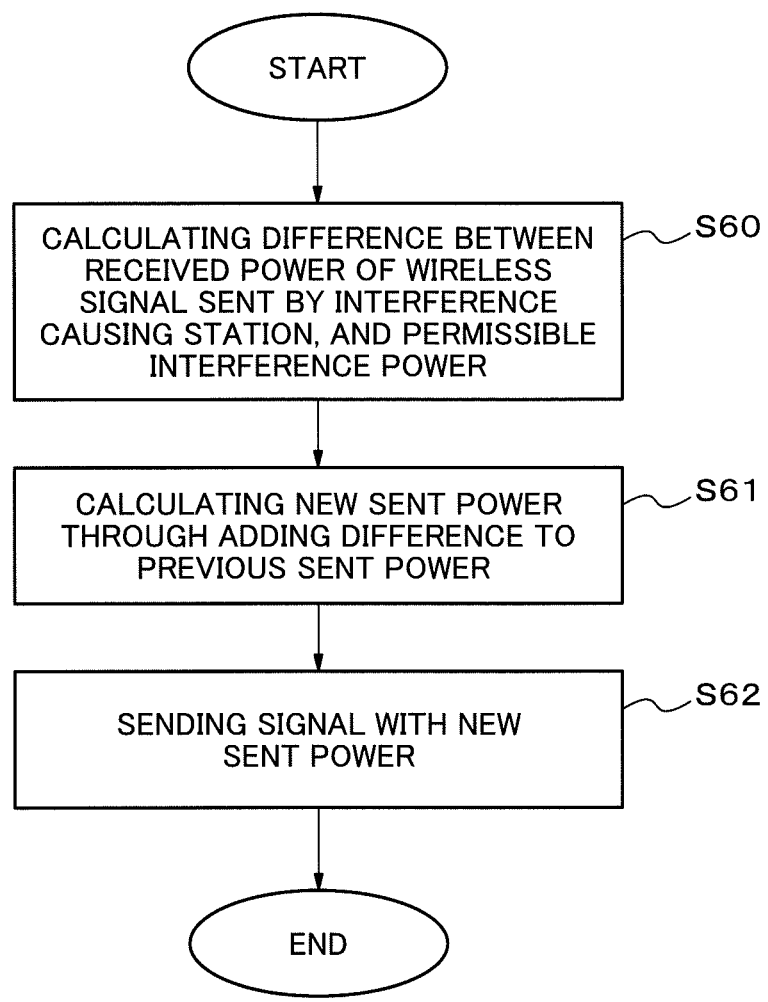
FIG. 15 is a flowchart explaining transmit control which is carried out by a transmit control unit of an interference causing station (first base station) included in a secondary system according to a fifth exemplary embodiment and which is different from the transmit control shown in FIG. 9.

FIG. 15 is a flowchart explaining transmit control which is carried out by the transmit control unit 116 of the first base station 22 (interference causing station) included in a secondary system according to a fifth exemplary embodiment and which is different from the transmit control shown in FIG. 9. A configuration of a wireless communication system, and a configuration of a first base station and a second base station, which are included in the wireless communication system, according to the present exemplary embodiment are the same as one of the wireless communication system (refer to FIG. 2) and one of the first base station 22 and the second base station 24 (refer to FIG. 3) according to the second exemplary embodiment, respectively. Therefore, description on the configurations is omitted. However, since an operation of the transmit control unit 116, which is included in the first base station 22, is different from one according to the second exemplary embodiment (refer to FIG. 9), the operation of the transmit control unit 116 will be described in the following.

The transmit control unit 116 of the first base station 22 (interference causing station) calculates a difference between the received power (received power of the wireless signal transmitted by the interference causing station) which is the monitoring result, and the permissible interference power (threshold value) (Step S60). Here, the received power is denoted as I, and the permissible interference power is denoted as Imax. Then, the difference ΔI is expressed by the following (formula 2).

$$\Delta I = I\text{max} - I \text{ [dB]} \quad \text{(formula 2)}$$

The transmit control unit 116 calculates the new transmit power through adding the difference ΔI to the previous transmit power (Step S61). Here, P(n) and P(n+1) are defined as the previous transmit power and the new transmit power, respectively. Then, the new transmit power P(n+1) is expressed by the following (formula 3).

$$P(n+1) = P(n) + \Delta I \text{ [dBm]} \quad \text{(formula 3)}$$

The transmit control unit 116 transmits a signal whose transmit power is coincident with the new transmit power P(n+1) (Step S62).

According to the fifth exemplary embodiment described above, since the interference causing station adjusts the transmit power on the basis of the difference between the monitored received power and the permissible interference power, the interference causing station can transmit a signal whose transmit power is maximum without causing the excessive interference to the primary system 10. Therefore, it is possible to provide a higher quality communication service in the secondary system 20 without causing the interference to the primary system 10.

Here, while the case that the interference causing station carries out the process of calculating the new transmit power on the basis of the difference between the received power and the permissible transmit power is exemplified according to the above mentioned description, the present exemplary embodiment is not limited to the case. For example, it is also possible that the monitoring station carries out the process. In this case, it is preferable that the monitoring station calculates the new transmit power by use of the above-mentioned method and transmits the calculation result to the interference causing station.

Sixth Exemplary Embodiment

Figure 16:
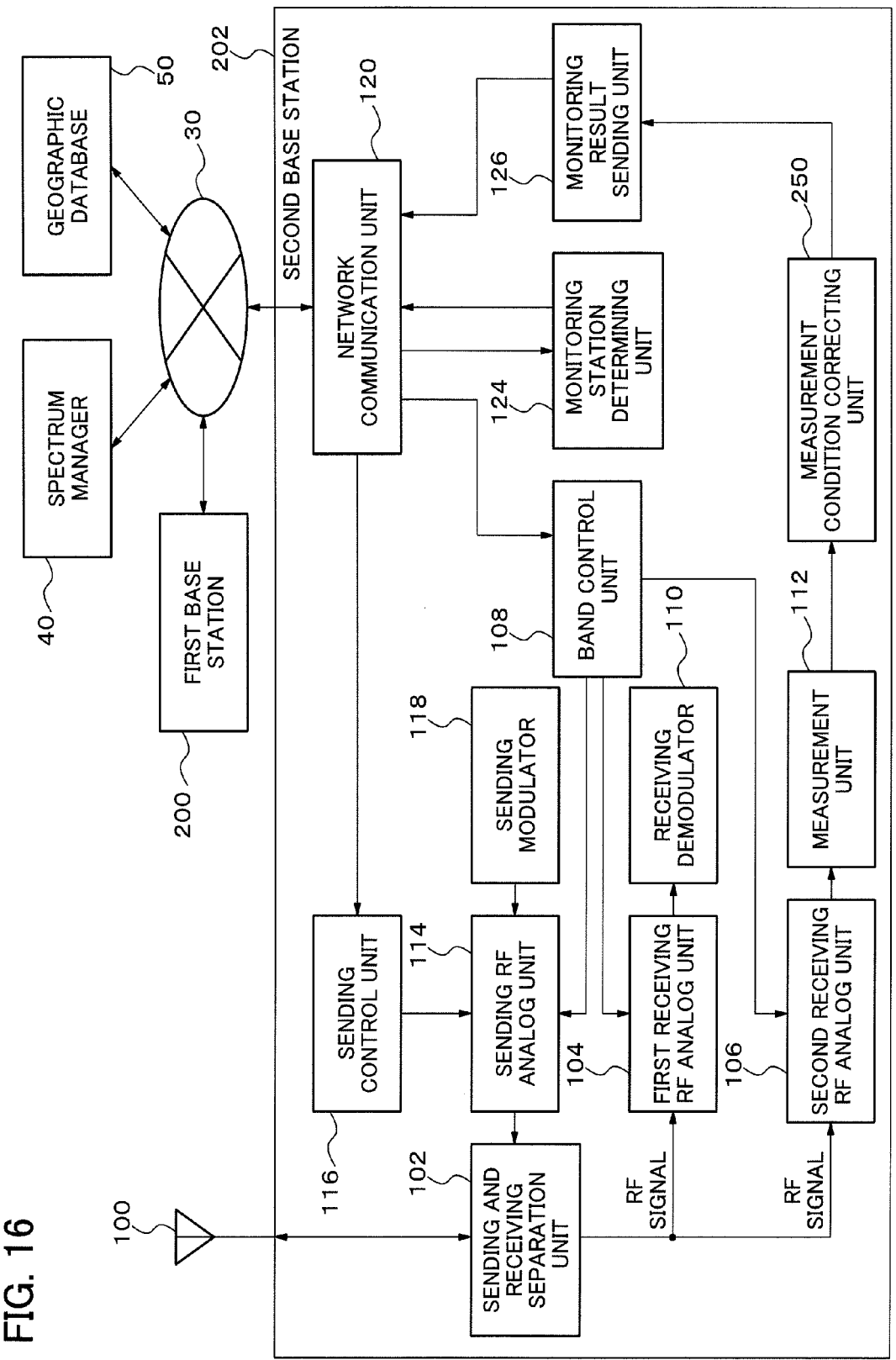
FIG. 16 is a block diagram showing an example of a configuration of an interference causing station (first base station) and a monitoring station (second base station) which are included in a secondary system of a wireless communication system according to a sixth exemplary embodiment.

FIG. 16 is a block diagram showing an example of a configuration of a first base station 200 (interference causing station) and a second base station 202 (monitoring station) which are included in a secondary system of a wireless communication system according to a sixth exemplary embodiment of the present invention. In order to make description simple, it is assumed hereinafter that the first base station 200 and the second base station 202 have the common configuration each other (that is, it is assumed that each base station has all functions which the first base station 200 and the second base station 202 have) similarly to the second exemplary embodiment, and the description will be provided under the assumption. Accordingly, the second base station 202 will be described as a typical station in the following.

The second base station 202 (refer to FIG. 16) according to the exemplary embodiment is different from the second base station 24 (refer to FIG. 3) according to the second exemplary embodiment in a point that the second base station 202 includes a measurement condition correcting unit 250 newly. As mentioned above, since the second base station 202 has the same configuration as the second base station 24 has except for the measurement condition correcting unit 250, description on the second base station 202 except for the measurement condition correcting unit 250 is omitted.

Figure 17:
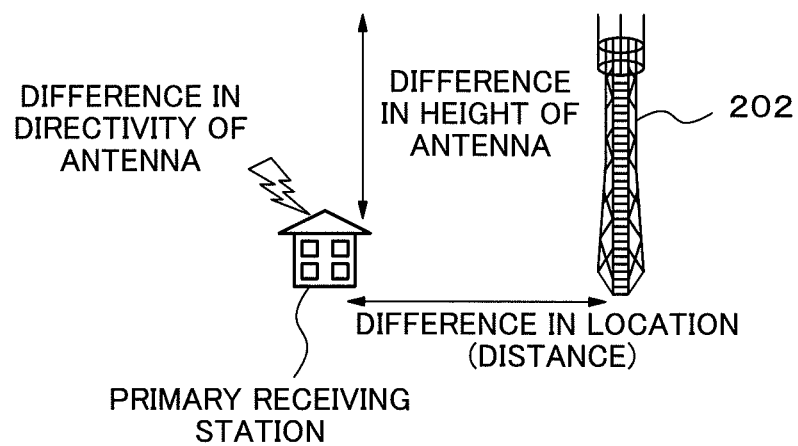
FIG. 17 shows an example of a measurement condition which is an object for correction carried out by a measurement condition correcting unit shown in FIG. 16.

Here, the monitoring station and a receiving station of the primary system 10, which receives interference actually, have the different measurement conditions each other. Then, the measurement condition correcting unit 250 of the monitoring station (second base station 202) carries out a process of correcting the difference. Specifically, the measurement condition correcting unit 250 carries out the correction process, in which the difference in the measurement condition is corrected, to a monitoring result (received power of the wireless signal which is transmitted by the interference causing station of the secondary system 20 and which causes the interference to the primary system 10) acquired from the measurement unit 112. As shown in FIG. 17, a location of each station, a height of each station and directivity of an antenna of each station are exemplified as the measurement condition in the following description. Here, the monitoring station accesses the geo-location database 50 in advance before carrying out a correction calculating process which will be shown in the following, and acquires information (information on the location, the height and the directivity of the antenna of the primary receiving station) required in the correction calculating process.

The received power before the correction, a correction component on the location, a correction component on the height, and a correction component on the directivity of the antenna are denoted as I, Γlocation, Γheight, and Γantenna respectively. Then, the received power after the correction Ie can be calculated by use of the following (formula 4).

$$Ie = I + \Gamma\text{location} + \Gamma\text{height} + \Gamma\text{antenna} \quad \text{(formula 4)}$$

It is possible to calculate the correction component on the location Γlocation and the correction component on the height Γheight by use of a predetermined propagation model in order to correct the difference.

For example, in the case that the Okumura and Tai model is applied to the propagation model, propagation loss Lp [dB] is expressed by the following (formula 5).

$$Lp \text{ [dB]} = 69.55 + 26.16 * \log(f) - 13.82 * \log(hb) - a(hm) + (44.9 - 6.55 * \log(hb)) * \log(d) \quad \text{(formula 5)}$$

where f is frequency [MHz] (150<f<2200), and hb is the transmitting station antenna height [m] (30<hb<200), and hm is the receiving station antenna height [m] (1<hm<10), and d is the propagation distance [km] (1<d<20). Moreover, log means a logarithm base 10. Moreover, a correction coefficient a(hm) according to the receiving station antenna height hm in (formula 4) is expressed by a formula of $(1.1*\log(f)-0.7)*hm-(1.56*\log(f)-0.8)$.

Moreover, a distance between the interference causing station of the secondary system 20 and the primary receiving station is denoted as d, and a distance between the interference causing station and the monitoring station of the secondary system 20 is denoted as d'. Then, the correction component on the location Γlocation is expressed by the following (formula 6).

$$\Gamma\text{location}=(44.9-6.55*\log(hb))*\log(d'/d) \quad \text{(formula 6)}$$

Moreover, the antenna height of the primary receiving station is denoted as hm, and the antenna height of the monitoring station of the secondary system 20 is denoted as h'm. Then, the correction component on the height Γheight is expressed by the following (formula 7).

$$\Gamma\text{height}=a(hm)-a(h'm)=(1.1*\log(f)-0.7)*(hm-h'm) \quad \text{(formula 7)}$$

Moreover, the correction component on the directivity of the antenna can be estimated, for example, by use of a known antenna pattern on the basis of a main axis direction of the antenna (direction to TV transmitter) and an incident interference direction.

For example, in the case that an antenna gain of the primary receiving station in the incident interference direction θint is denoted as GR(θint), and an antenna gain of the monitoring station of the secondary system 20 is denoted as G'R(θint), the correction component on the directivity of the antenna is expressed by the following (formula 8).

$$\Gamma\text{antenna}=GR(\theta int)-G'R(\theta int) \quad \text{(formula 8)}$$

According to the sixth exemplary embodiment described above, the measurement condition correcting unit 250 corrects the difference between the measurement condition of the monitoring station, and the measurement condition of the receiving station of the primary system which is caused interference actually. Accordingly, the secondary system 20 can carry out the transmit power control on the basis of the more accurate measurement result (for example, received power).

While the case that all of three measurement conditions are corrected is exemplified according to the above description, it is also possible to correct only one out of three conditions. Moreover, a measurement condition corresponding to a correction object is not limited to the above-mentioned measurement condition (location, height and directivity of antenna).

Moreover, while the correction of the measurement condition is carried out to the measured interference causing power according to the above description, in the case that the desired signal power of the primary system is measured like the second to the fourth exemplary embodiments, it is also possible to convert the measurement result on the desired signal power at the monitoring station into the measurement result at the receiving station of the primary system through correcting the measured value similarly. It is possible to select the monitoring station, which can acquire more accurate measurement result, through determining the candidate for the monitoring station or the monitoring station according to the second to the fourth exemplary embodiments by use of the desired signal power which is corrected and which is transmitted by the primary system, and the interference causing power which is corrected and which is caused by the secondary system.

Furthermore, in the case that the base station of the secondary system is divided into sectors (for example, composition of three sectors), it is possible to correct the directivity of the antenna of each sector as described above through handling an unit of not the base station but the sector as one candidate for the monitoring station. Through carrying out the correction process, it is possible to select the sector whose interference causing measurement accuracy metric according to the fourth exemplary embodiment is high, and consequently to select the sector which can acquire more accurate measurement result.

Moreover, while the case that the monitoring station carries out the measurement condition correcting process is exemplified according to the above-mentioned description, it is also possible that the interference causing station carries out the process. That is, in this case, it is preferable that the monitoring station transmits the monitoring result, which is monitored before the correction, to the interference causing station, and the interference causing station carries out the above-mentioned correction process to the received monitoring result which is monitored before the correction. In this case, it is preferable that the measurement condition correcting unit 250 is arranged, for example, between the network communication unit 120 and the transmit control unit 116 in the interference causing station. Moreover, in this case, it is preferable that the interference causing station acquires information, which is required in the correction calculating process, from the geo-location database 50.

Moreover, while the case that the exemplary embodiment is applied to the second exemplary embodiment is exemplified according to the above-mentioned description, it is also possible to apply the exemplary embodiment to the third to the fifth exemplary embodiments, or a combination of at least two out of the second to the fifth exemplary embodiments.

Seventh Exemplary Embodiment

Figure 18:
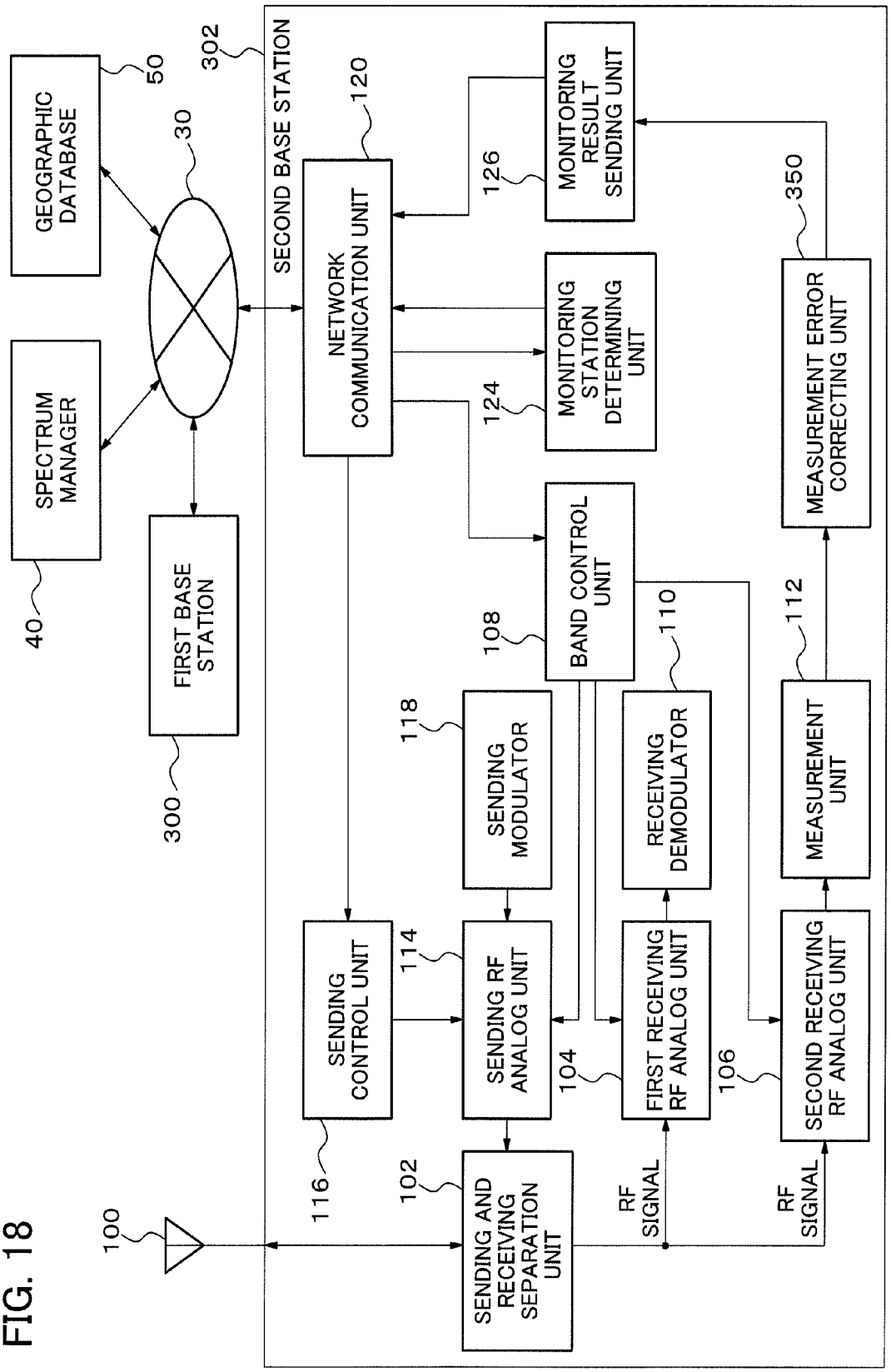
FIG. 18 is a block diagram showing an example of a configuration of an interference causing station (first base station) and a monitoring station (second base station) which are included in a secondary system of a wireless communication system according to a seventh exemplary embodiment of the present invention.

FIG. 18 is a block diagram showing an example of a configuration of a first base station 300 (interference causing station)) and a second base station 302 (monitoring station) which are included in a secondary system of a wireless communication system according to a seventh exemplary embodiment of the present invention. In order to make description clear, it is assumed hereinafter that the first base station 300 and the second base station 302 have the common configuration each other (that is, it is assumed that each base station has all functions which the first base station 300 and the second base station 302 have) similarly to the second exemplary embodiment, and the description will be provided under the assumption. Accordingly, the second base station 302 will be described as a typical station in the following.

The second base station 302 (refer to FIG. 18) according to the present exemplary embodiment is different from the second base station 24 (refer to FIG. 3) according to the second exemplary embodiment in a point that the second base station 302 includes a measurement error correcting unit 350 newly. Here, since the second base station 302 has the same configuration as the second base station 24 has except for the measurement error correcting unit 350 as mentioned above, description on the second base station 302 except for the measurement error correcting unit 350 is omitted.

Here, due to the thermal noise which is included in the monitoring process, and due to influence which is caused by the signal transmitted by the primary system 10, a value of the received power, which the monitoring station measures, includes not a small amount of measurement error. There is a possibility that the received power which the monitoring station measures, that is, the interference causing power, which affects the primary system 10, may be underestimated due to the measurement error. In this case, there is a fear that the interference causing station of the secondary system 20 transmits a signal with the transmit power which exceeds the permissible interference power of the primary system 10. Then, the measurement error correcting unit 350 of the monitoring station (second base station 302) adds a margin, which is based on the measurement error, to the received power which the monitoring station measures, and corrects the received power.

In the following description, a case that the margin, which is based on "variance (for example, standard deviation)" of the measurement error, is added to the measured received power is exemplified. It is needless to say that essence of the present exemplary embodiment is to add the margin based on the measurement error, and it is not always necessary that the margin is based on the variance of the measurement error.

Figure 19:
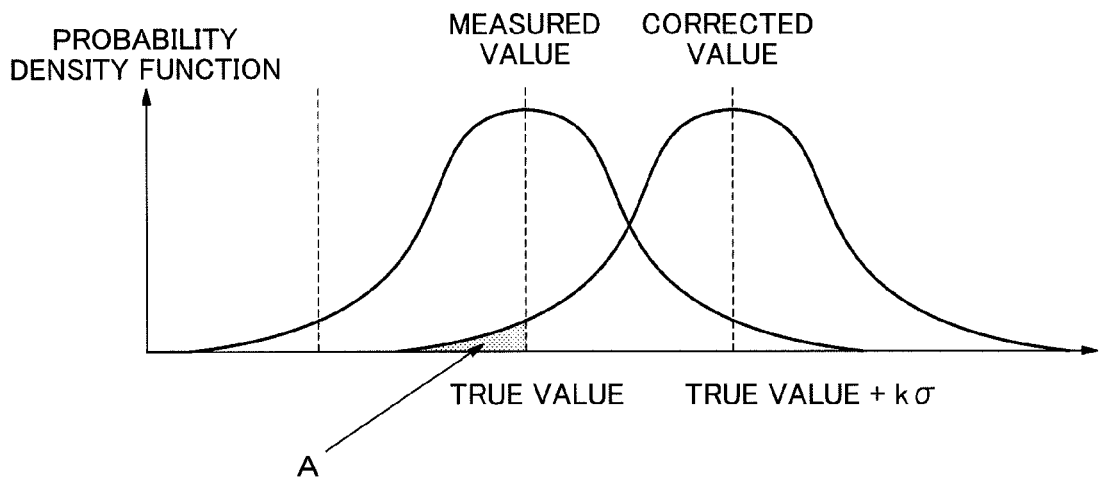
FIG. 19 is a conceptual diagram showing a measurement error related to the seventh exemplary embodiment.

FIG. 19 is a conceptual diagram showing the measurement error. Usually, a measured value may include an error whose value distributes symmetrically on both sides of a true value, and the measurement error may be approximated by the Gaussian distribution (average value is 0 and variance is $\sigma^2$) in some cases as shown in FIG. 19. Here, while it is assumed that the measurement error is based on the Gaussian distribution according to the present exemplary embodiment, if the distribution of the measurement error is known in advance, it is possible to assume the distribution similarly by use of the known distribution.

The measured received power (interference causing power before the correction), a margin parameter according to the measurement error, and a variance parameter of the Gaussian distribution are denoted as I, k, and $\sigma$, respectively. Then, the received power after the correction Ie is expressed by the following (formula 9).

$$Ie = I + k * \sigma \qquad \text{(formula 9)}$$

Here, the variance $\sigma^2$ of the Gaussian distribution is determined on the basis of a total of the thermal noise power and the received power of the signal transmitted by the primary system 10, a measurement method, and a period of time for the measurement in the monitoring station. Here, the thermal noise power and the received signal power are measured by the monitoring station in advance before the correction process is carried out, and the variance $\sigma^2$ is determined on the basis of the measurement method and the period of time for the measurement.

A value, which is changed on the basis of a required degree of protection against the interference, is assigned to the margin parameter k. For example, in the case that the Gaussian distribution is assumed, it is well known that a probability that an estimated value of the interference power is smaller than a true value (that is, probability that a corrected value is smaller than the measured value (area indicated by A in FIG. 10)) is 15.8% in the case of k=1, 2.4% in the case of k=2, and 0.15% in the case of k=3.

For example, in the case that the true value of the interference power is equal to the permissible interference power and k is equal to 2, the probability that the corrected value is larger than the permissible interference power is 97.6%, and the probability that the corrected value is smaller than the permissible interference power is 2.4%. That is, in the case of k=2, it is possible to decrease the transmit power (or to stop the transmitting) with the probability of 97.6%, and it is possible to reduce the probability of causing the interference, whose power exceeds the permissible interference power due to increasing the transmit power, down to 2.4%. Accordingly, it is possible to lower the probability of causing the interference whose power exceeds the permissible interference power.

According to the seventh exemplary embodiment described above, it is possible to carry out the accurate interference causing control irrespective of the measurement method carried out by the monitoring station, through changing the margin for the measurement error. For example, it is possible to prevent a situation of causing the interference, whose power exceeds the permissible interference power, to the primary system 10 due to underestimation of the measured received power (interference causing power).

Here, while the margin for the measurement error is added to the measured interference causing power according to the above description, it is also possible to add another margin for a decrease of the received power, which is due to influence of the shadowing and the fading, to the interference causing power.

While the case that the present exemplary embodiment is applied to the second exemplary embodiment is exemplified according to the above description, the present invention is not limited to the case. It is possible to apply the present exemplary embodiment to the third to the sixth exemplary embodiments, or a combination of at least two out of the second to the sixth exemplary embodiments. In the case that the present exemplary embodiment is combined with the sixth exemplary embodiment (that is, includes the measurement condition correcting function), it is possible to arrange the measurement condition correcting unit and the measurement error correcting unit in series (any processing order is permitted) or in parallel. In the case of the parallel arrangement, it is possible to switch the measurement condition correcting unit and the measurement error correcting unit each other on the basis of a predetermined metric.

Here, while the case that the monitoring station carries out the measurement error correcting process is exemplified according to the above description, it is also possible that the interference causing station carries out the process. That is, in this case, it is preferable that the monitoring station transmits the monitoring result, which is monitored before the correction, to the interference causing station, and the interference causing station carries out the above-mentioned correction process to the received monitoring result which is monitored before the correction. In this case, it is preferable that the measurement error correcting unit 350 is arranged, for example, between the network communication unit 120 and the transmit control unit 116 in the interference causing station.

Eighth Exemplary Embodiment

Figure 20:
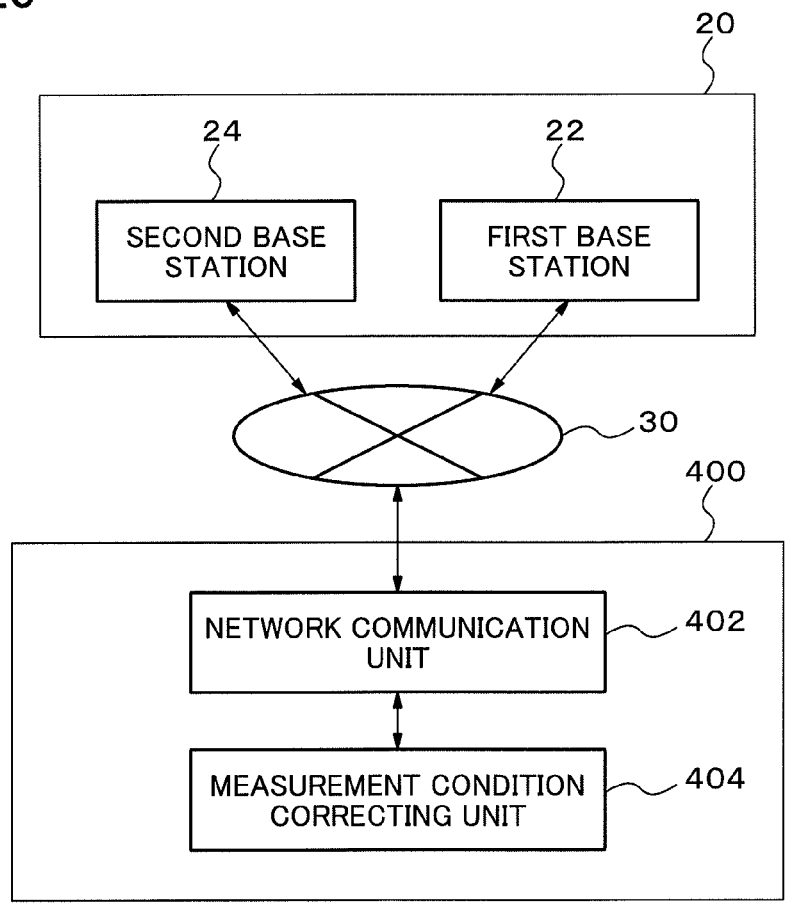
FIG. 20 is a block diagram showing an example of a configuration of a spectrum manager according to an eighth exemplary embodiment of the present invention.

FIG. 20 is a block diagram showing an example of a configuration of a spectrum manager 400 (control apparatus) according to an eighth exemplary embodiment of the present invention. The spectrum manager 40 according to the second to the seventh exemplary embodiments is the mere relay apparatus between the interference causing station and the monitoring station. However, the spectrum manager 400 according to the present exemplary embodiment has a feature of installing a part of the functions of the interference causing control which is carried out in the secondary system 20. Here, a part of the functions means specifically a part of or a whole of the functions of the interference causing control except for the monitoring function. For example, a part of the functions means a function corresponding to the measurement condition correcting unit 250 (refer to FIG. 16) according to the sixth exemplary embodiment.

The spectrum manager 400 includes a network communication unit 402 and a measurement condition correcting unit 404. The network communication unit 402 communicates with the first base station 22 (interference causing station) and the second base station 24 (monitoring station), which are included in the secondary system 20, via the network 30. The measurement condition correcting unit 404 has the same function as the measurement condition correcting unit 250 according to the sixth exemplary embodiment has.

That is, the network communication unit 402 of the spectrum manager 400 receives the received power, which is monitored before the correction, from the second base station 24. Then, the network communication unit 402 does not transmit this value as it is to the first base station 22, but transmits the received power, which is corrected by the measurement condition correcting unit 404, to the first base station 22. Here, as an example of "corrected received power", it is possible to exemplify the corrected value which is obtained through correcting the difference in the measurement condition and which is expressed by (formula 4).

According to the eighth exemplary embodiment described above, it is possible to make the configuration of the secondary system 20 simple through transferring a part of the functions of the interference causing control of the secondary system 20 to the spectrum manager 400.

Here, while the case that the measurement condition correcting unit 404 is installed in the spectrum manager 400 is exemplified according to the above description, the present exemplary embodiment is not limited to the case. For example, it is also possible to install the measurement error correcting function (function corresponding to the measurement error correcting unit 350 according to the seventh exemplary embodiment) in the spectrum manager 400 in place of or in addition to the measurement condition correcting unit 404.

In the case that the spectrum manager 400 has the measurement condition correcting function and the measurement error correcting function, it is possible to arrange the measurement condition correcting unit and the measurement error correcting unit in series (any processing order is permitted) or in parallel. In the case of the parallel arrangement, it is possible to switch the measurement condition correcting unit and the measurement error correcting unit each other on the basis of a predetermined metric.

Moreover, it is possible to install another function of the interference causing control, for example, the transmit control function (function corresponding to the transmit control unit 116 according to the second and the fifth exemplary embodiments) in the spectrum manager 400 in place of or in addition to each of the correction functions. That is, in this case, the spectrum manager 400 receives the measured received power (that is, received power which is not corrected yet) from the monitoring station, and carries out the correction process (measurement condition correcting process and/or measurement error correcting process) according to necessity. The spectrum manager 400 carries out a final judgment on the transmit control for the interference causing station, and transmits the judgment result (that is, instruction to stop the transmitting or to continue the transmitting, or new value of the transmit power based on the difference) to the interference causing station.

Moreover, it is also possible to install another function of the interference causing control, for example, the monitoring station determining function (function corresponding to the monitoring station determining unit 124 according to the second exemplary embodiment) in the spectrum manager 400. In this case, it may be preferable to install only the monitoring station determining function, or it is also possible to install the monitoring station determining function in addition to the above-mentioned each correction function and the transmit control function.

Here, in the second to the eighth exemplary embodiments described above, it is also possible that the monitoring station estimates beforehand the received power of the primary signal (TV signal) and the noise power before the interference causing station transmits the signal. Here, before the interference causing station transmits the signal, the received signal, which exists in the monitoring target frequency band and which the monitoring station receives, includes the TV signal and the thermal noise which is caused in the receiving device of the monitoring station. The monitoring station measures the received power within the frequency band in advance. The monitoring station may subtract the received power of the TV signal and the noise power, which are measured in advance, from the received power within the monitoring target frequency band, and the subtraction result can be used as the measurement result of the received power.

Moreover, in the second to the eighth exemplary embodiments described above, it is also possible to estimate the received power on the basis of another characteristic quantity instead of measuring the received power directly. For example, it is also possible to estimate the received power by use of a correlation value which is calculated with the sliding correlation of a pilot signal. Specifically, it is also possible that the value of the correlation between the pilot signal which is received actually, and the known pilot signal is calculated by use of the sliding correlation, and the maximum correlation value is extracted, and the received power of the pilot signal is estimated on the basis of the maximum correlation value, and furthermore total received power (a total of the pilot signal power and the data signal power) is estimated. Here, it is possible to calculate the received power of the pilot signal through generating beforehand a table which indicates association between the maximum correlation value and the received power of the pilot signal, and searching for the received power of the pilot signal in the table by use of the extracted maximum correlation value as a search key.

Figure 21:
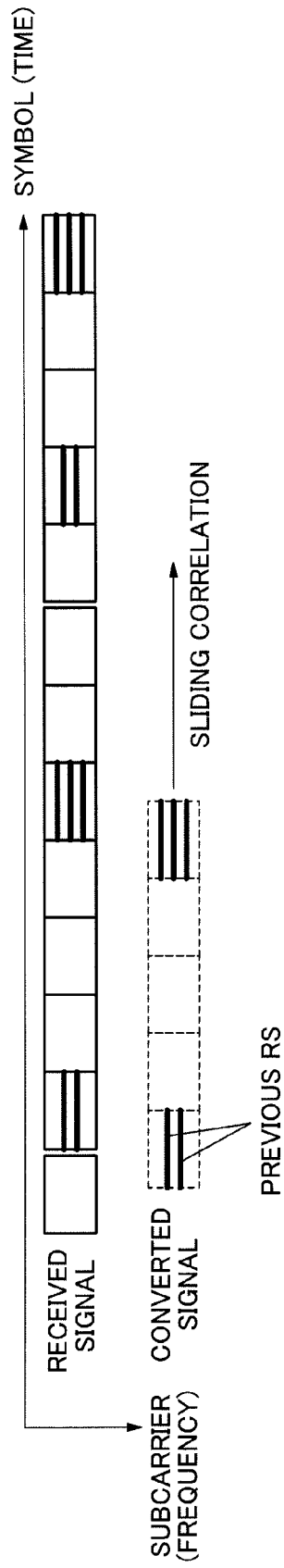
FIG. 21 is a conceptual diagram showing the sliding correlation.

FIG. 21 is a conceptual diagram showing the sliding correlation. For example, in the case that the interference causing signal is a LTE (Long Term Evolution) downlink signal, the interference causing station notifies the monitoring station, to which the interference causing station requests the monitoring, of its own cell ID (Identification) via the network 30. The monitoring station generates RS (Reference Signal which is the known pilot signal used for the channel estimation or the like, and is associated with the cell ID) corresponding to the notified cell ID, and furthermore converts RS into a time-domain signal.

$$T_{max} = \max_{0 \leq n \leq N-1} \left| \frac{1}{K} \sum_{k=0}^{K-1} y(n+k) i_p^*(k) \right| \quad \text{(formula 10)}$$

Figure 22:
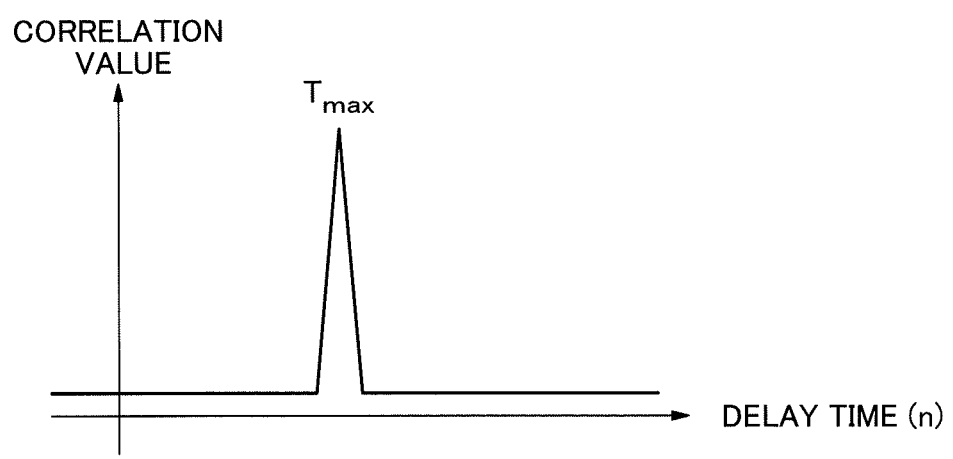
FIG. 22 is a graph showing the maximum correlation value of the sliding correlation.

By use of (formula 10), the monitoring station calculates the maximum correlation value Tmax (refer to FIG. 22) on the basis of the sliding correlation between complex conjugate ($i_p^*(k)$) of the RS signal which is converted into the time-domain signal (abbreviated as "converted signal" in FIG. 21), and the received signal ($y(n+k)$). Then, the monitoring station searches for the received power of the pilot signal in the table by use of the maximum correlation value as the key, and consequently extracts the received power of the pilot signal. Here, Kin (formula 10) means a RS sequence length in the time domain. The monitoring station transmits the extracted received power of the pilot signal to the interference causing station. Moreover, it is possible that the interference causing station estimates the total received power (that is, interference power) of the monitoring station by use of power ratio of the total transmit power, which includes power of the data unit, to the transmit power of the pilot signal, and the received power of the pilot signal which is transmitted by the monitoring station.

Here, in the second to the eighth exemplary embodiments described above, the interference causing station and the monitoring station which are included in the secondary system 20 are not limited to the base station. It may be preferable that the interference causing station and the monitoring station are, for example, a relay station or a terminal station. Moreover, it is also possible that the monitoring station is a monitoring node dedicated for the monitoring.

Moreover, in the second to the eighth exemplary embodiments described above, to measure the wireless signal, which is transmitted in the secondary system (interference causing system) and which causes the interference to the primary system (interference receiving system), does not always mean to measure the received power. It may be preferable that to measure the wireless signal means to measure another metric (physical quantity) as far as it is possible to recognize a degree of the interference to the primary system 10.

Moreover, in the first to the eighth exemplary embodiments described above, it may be preferable that the primary system 10 and the secondary system 20 are based on the different RAT (Radio Access Technology) each other, or the same RAT. As a case of the different RAT, for example, a combination of the TV broadcasting system and the cellular system mentioned above is exemplified. As a case of the same RAT, for example, the primary system 10 is based on the macrocell, and the secondary system 20 is based on the femto-cell which is arranged within the macro-cell.

Here, it is possible to realize the first to the eighth exemplary embodiments described above by predetermined hardware, for example, by a circuit.

Moreover, it is possible to realize the first to the eighth exemplary embodiments described above through making a computer circuit (for example, CPU (Central Processing Unit)), which is not shown in the figure, carry out the control and the operation according to the first to the eighth exemplary embodiments on the basis of a control program. In the case, the control program is stored, for example, by a storage medium inside the apparatus or the system or an external storage medium. Then, the computer circuit reads the control program to carry out the control. As the internal storage medium, for example, ROM (Read Only Memory), a hard disk or the like is exemplified. Meanwhile, as the external storage medium, for example, a removable medium, a removable disk or the like is exemplified While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-044350, filed on Mar. 1, 2010, the disclosure of which is incorporated herein in its entirety by reference.

REFERENCE SIGNS LIST

1 Interference causing system
2 Interference causing station
3 Monitoring station
4 Determination unit
10 Primary system
12 Broadcasting station (primary transmitting station)
20 Secondary system
22 First base station
24, and 24A to 24D Second base station
30 Network
40 Spectrum manager
50 Geo-location database
60 Another interference causing station
100 Antenna
102 Transmitting and receiving separation unit
104 First receiving RF analog unit
106 Second receiving RF analog unit
108 Band control unit
110 Receiving demodulator
112 Measurement unit
114 Transmitting RF analog unit
116 Transmitting control unit
118 Transmitting modulator
120 Network communication unit
124 Monitoring station determining unit
126 Monitoring result transmitting unit
200 First base station
202 Second base station
250 Measurement condition correcting unit
300 First base station
302 Second base station
350 Measurement error correcting unit
400 Spectrum manager
402 Network communication unit
404 Measurement condition correcting unit

The invention claimed is:

1. A wireless station comprising:
a determination unit to determine at least one monitoring station measuring a wireless signal, which is transmitted by the wireless station and which causes interference to another system, out of plural wireless stations of a wireless communication system to which the wireless station belongs,
wherein the determination unit determines at least one wireless station, whose permissible transmit power satisfying a protection condition against interference is smaller than one of another wireless station or is smaller than a predetermined threshold value, as the monitoring station out of the plural wireless stations.

2. The wireless station according to claim 1, wherein the permissible transmit power is calculated per each of the plural wireless stations on the basis of a measured value or an estimated value of received power of a desired signal, which the other system transmits, at each of the plural wireless stations, and an estimated value of propagation loss between the wireless station and each of the plural wireless stations.

3. The wireless station according to claim 2, wherein the permissible transmit power is calculated on the basis of the measured value or the estimated value of the received power of the desired signal, and the estimated value of the propagation loss with considering additionally existing interference power received at each of the plural wireless station and caused by at least one wireless station which is different from the wireless station and which transmits another wireless signal of the same frequency as the wireless signal.

4. The wireless station according to claim 3, wherein the one wireless station different from the wireless station is either one different wireless station which transmits another wireless signal using the frequency in the wireless communication system to which the wireless station belongs, or one different wireless station which transmits another wireless signal using the frequency in a wireless communication system different from the wireless communication system to which the wireless station belongs.

5. The wireless station according to claim 3, wherein the permissible transmit power is calculated on the basis of a value obtained through subtracting the existing interference power from permissible interference power which is calculated on the basis of the measured value or the estimated value of the received signal of the desired signal.

6. The wireless station according to claim 1, further comprising a transmit control unit which carries out transmit control on the basis of a measurement result of the monitoring station.

7. The wireless station according to claim 6, wherein the transmit control is carried out on the basis of a result of comparing the measurement result with a predetermined threshold value.

8. The wireless station according to claim 7, wherein the transmit control comprises a transmitting stopping process on the basis of the result of comparing the measurement result with the predetermined threshold value.

9. The wireless station according to claim 7, wherein the transmit control comprises a process of adjusting a transmit power of the wireless station so as to be coincident with a transmit power based on a difference between the measured value and the threshold value.

10. The wireless station according to claim 6, wherein the transmit control unit carries out the transmit control on the basis of a corrected measurement result which is obtained through carrying out a predetermined correction process to the measurement result.

11. The wireless station according to claim 10, wherein the correction process comprises a process of adding a margin, which is based on a measurement error, to the measurement result.

12. The wireless station according to claim 11, wherein the margin is based on variance (standard deviation) of the measurement error.

13. A wireless station comprising:
a determination unit to determine at least one monitoring station measuring a wireless signal, which is transmitted by the wireless station and which causes interference to another system, out of plural wireless stations of a wireless communication system to which the wireless station belongs,
wherein the determination unit determines at least one first monitoring station which measures received power of a desired signal which the other system transmits, and at least one second monitoring station which is different from the first monitoring station and which measures received power of the wireless signal of the wireless station, and
wherein the determination unit determines at least one wireless station, whose permissible transmit power satisfying a protection condition against interference is smaller than other wireless stations or is smaller than a predetermined threshold value, as the first monitoring station out of the plural wireless stations.

14. The wireless station according to claim 13, wherein the determination unit determines at least one wireless station, which satisfies, at least, a condition of existing around the first monitoring station, a condition that it is judged to receive a wireless signal whose received power is larger than the received power at the first monitoring station, and a condition of having an interference causing measurement accuracy metric which is larger than one at the first monitoring station, as the second monitoring station out of the plural wireless stations.

15. A wireless station comprising:
a determination unit to determine at least one monitoring station measuring a wireless signal, which is transmitted by the wireless station and which causes interference to another system, out of plural wireless stations of a wireless communication system to which the wireless station belongs,
wherein the determination unit determines at least one wireless station, which satisfies, at least, a condition of existing around the first monitoring station, a condition that it is judged to receive a wireless signal whose received power is larger than the received power at the first monitoring station, and a condition of having an interference causing measurement accuracy metric which is larger than one at the first monitoring station, as the second monitoring station out of the plural wireless stations, and
wherein the determination unit determines a plurality of monitoring stations, and selects the monitoring station, which should carry out monitoring next time, out of the plural monitoring stations on the basis of a monitoring result, which each of the plural monitoring stations outputs, after the wireless station starts transmitting the wireless signal.

16. The wireless station according to claim 15, wherein
the monitoring result is received power of a desired signal, which is transmitted by the other system, at each of the plural monitoring stations, and received power of the wireless signal, which is transmitted by of the wireless station, at each of the plural monitoring stations; and
the determination unit calculates SIR (Signal to Interference Ratio), which indicates ratio between both of the received powers, per each of the plural monitoring stations, and selects at least one monitoring station, whose SIR is smaller than one of another monitoring station or is smaller than a predetermined value, out of the plural monitoring stations.

17. A wireless station comprising:
a determination unit to determine at least one monitoring station measuring a wireless signal, which is transmitted by the wireless station and which causes interference to another system, out of plural wireless stations of a wireless communication system to which the wireless station belongs,
wherein before determining the monitoring station, the determination unit determines a plurality of candidates for the monitoring station out of the plural wireless stations, and selects at least one monitoring station out of the plural candidates for the monitoring station on the basis of a predetermined reference, and
wherein the predetermined reference is that a measured value or an estimated value of received power of a desired signal, which is transmitted by the other system, at each of the plural wireless stations is not smaller than a predetermined first threshold value, and
wherein the predetermined reference is that the measured value or the estimated value at each of the plural wireless stations is not smaller than the first threshold value, and a measured value or an estimated value of received power of the wireless signal, which is transmitted by the wireless station, at each of the plural wireless stations is not smaller than a predetermined second threshold value.

18. A wireless station comprising:
a determination unit to determine at least one monitoring station measuring a wireless signal, which is transmitted by the wireless station and which causes interference to another system, out of plural wireless stations of a wireless communication system to which the wireless station belongs; and a transmit control unit which carries out transmit control on the basis of a measurement result of the monitoring station, wherein the transmit control unit carries out the transmit control on the basis of a corrected measurement result which is obtained through carrying out a predetermined correction process to the measurement result, and wherein the correction process comprises a process of correcting a difference between a measurement condition of a receiving station of the other system, and a measurement condition of the monitoring station.

19. The wireless station according to claim 18, wherein the difference between the measurement conditions is at least one of a difference between a location of the receiving station and a location of the monitoring station, a difference between a height of the receiving station and a height of the monitoring station, and a difference between directivity of an antenna of the receiving station and directivity of an antenna of the monitoring station.

20. A determination apparatus, wherein the determination apparatus is configured to determine at least one second wireless station measuring a wireless signal, which is transmitted by a first wireless station and which causes interference to another system, out of plural wireless stations of a wireless communication system to which the first wireless station belongs, and wherein the determination apparatus determines at least one wireless station, whose permissible transmit power satisfying a protection condition against interference is smaller than one of another wireless station or is smaller than a predetermined threshold value, as the at least one second wireless station out of the plural wireless stations.

21. A wireless communication system comprising:

plural wireless stations; and a first wireless station, wherein the wireless communication system is configured to determine at least one second wireless station measuring a wireless signal, which is transmitted by the first wireless station and which causes interference to another system, out of the plural wireless stations of the wireless communication system to which the first wireless station belongs, wherein the wireless communication system is further configured to determine at least one wireless station, whose permissible transmit power satisfying a protection condition against interference is smaller than one of another wireless station or is smaller than a predetermined threshold value, as the at least one second wireless station out of the plural wireless stations.

22. A determination method comprising:

determining at least one second wireless station measuring a wireless signal, which is transmitted by a first wireless station and which causes interference to another system, out of plural wireless stations of a wireless communication system to which the first wireless station belongs, wherein the determining includes determining at least one wireless station, whose permissible transmit power satisfying a protection condition against interference is smaller than one of another wireless station or is smaller than a predetermined threshold value, as the at least one second wireless station out of the plural wireless stations.

23. A non-transitory computer-readable medium to store a computer program for making a computer execute a process comprising:

determining at least one second wireless station measuring a wireless signal, which is transmitted by a first wireless station and which causes interference to another system, out of plural wireless stations of a wireless communication system to which the first wireless station belongs, wherein the determining includes determining at least one wireless station, whose permissible transmit power satisfying a protection condition against interference is smaller than one of another wireless station or is smaller than a predetermined threshold value, as the at least one second wireless station out of the plural wireless stations.

* * * * *

UNITED STATES PATENT AND TRADEMARK OFFICE
CERTIFICATE OF CORRECTION

PATENT NO. : 9,049,603 B2
APPLICATION NO. : 13/582280
DATED : June 2, 2015
INVENTOR(S) : Kazushi Muraoka, Hiroto Sugahara and Masayuki Ariyoshi It is certified that error appears in the above-identified patent and that said Letters Patent is hereby corrected as shown below:

In the specification

Column 8, Line 52: Delete "RE" and insert -- RF --

Column 9, Line 12: Delete "RE" and insert -- RF --

Column 9, Line 19: Delete "RE" and insert -- RF --

Column 9, Line 34: Delete "RE" and insert -- RF --

Column 9, Line 62: Before "(second" insert -- 20 --

Column 14, Line 39: Before "(interference" insert -- 22 --

Signed and Sealed this
Eighth Day of December, 2015

Michelle K. Lee
*Director of the United States Patent and Trademark Office*